(12) United States Patent
Wilson

(10) Patent No.: US 11,624,175 B2
(45) Date of Patent: *Apr. 11, 2023

(54) SHOWER BAR SYSTEM

(71) Applicant: Kohler Co., Kohler, WI (US)

(72) Inventor: John M. Wilson, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,895

(22) Filed: Nov. 5, 2021

(65) Prior Publication Data

US 2022/0056679 A1 Feb. 24, 2022

Related U.S. Application Data

(63) Continuation of application No. 16/581,071, filed on Sep. 24, 2019, now Pat. No. 11,174,627, which is a
(Continued)

(51) Int. Cl.
*E03C 1/06* (2006.01)
*E03C 1/02* (2006.01)
(Continued)

(52) U.S. Cl.
CPC ............. *E03C 1/066* (2013.01); *E03C 1/021* (2013.01); *E03C 1/025* (2013.01); *E03C 1/0408* (2013.01);
(Continued)

(58) Field of Classification Search
CPC ....................................................... E03C 1/066
(Continued)

(56) References Cited

U.S. PATENT DOCUMENTS 1,758,155 A 5/1930 Harvey
1,847,917 A 3/1932 Binns
(Continued)

FOREIGN PATENT DOCUMENTS

CN 85205621 U 2/1988
CN 2223960 Y 4/1996
(Continued)

OTHER PUBLICATIONS

English translation of Notification of First Office Action from the State Intellectual Property Office of the People's Republic of China for Application No. 201180065793.X dated Mar. 24, 2014 (8 pages).
(Continued)

*Primary Examiner* — Lori L Baker
(74) *Attorney, Agent, or Firm* — Michael Best & Friedrich LLP

(57) ABSTRACT

An assembly for a shower system having first and second shower members and connectable to a water supply with a supply pipe having a pipe outlet. The assembly includes an adjustable supply assembly and a diverter valve. The adjustable supply assembly includes an adapter coupleable to the pipe outlet, a supply member having a supply outlet and coupled to the adapter for movement along the axis, and a seal positioned to provide a sealed connection in adjusted positions. The diverter valve includes a valve inlet in fluid communication with the supply outlet, and first and second valve outlets in fluid communication with the first and second shower members, respectively. The shower system is mounted in an enclosure having a wall. The adapter connects to the pipe outlet on one side of the wall, and the diverter valve is located on another side of the wall.

16 Claims, 19 Drawing Sheets

Related U.S. Application Data continuation of application No. 15/997,471, filed on Jun. 4, 2018, now Pat. No. 10,422,113, which is a continuation of application No. 15/586,139, filed on May 3, 2017, now Pat. No. 10,024,038, which is a continuation of application No. 15/056,642, filed on Feb. 29, 2016, now Pat. No. 9,677,256, which is a continuation of application No. 13/328,832, filed on Dec. 16, 2011, now Pat. No. 9,273,452.

(60) Provisional application No. 61/424,539, filed on Dec. 17, 2010.

(51) Int. Cl.
*E03C 1/04* (2006.01)
*F16K 11/085* (2006.01)

(52) U.S. Cl.
CPC ........ *F16K 11/085* (2013.01); *F16K 11/0856* (2013.01); *E03C 2201/30* (2013.01)

(58) Field of Classification Search
USPC .......... 239/548–549, 200; 77/290, 302, 418, 77/543; 137/357; 4/615–618
See application file for complete search history.

(56) References Cited

U.S. PATENT DOCUMENTS

| | | | |
|---|---|---|---|
| 2,598,092 A | 5/1952 | Alvey | |
| 2,685,093 A | 8/1954 | Lundquist | |
| 2,759,765 A | 8/1956 | Pawley | |
| 3,136,570 A | 6/1964 | Lee | |
| 3,564,621 A | 2/1971 | Fletcher | |
| 3,737,107 A | 6/1973 | Wright | |
| 4,171,094 A | 10/1979 | Halfen | |
| 4,271,543 A | 6/1981 | Martin | |
| 4,274,400 A | 6/1981 | Baus | |
| 4,523,604 A | 6/1985 | Hutto | |
| 4,739,596 A | 4/1988 | Cunningham et al. | |
| 4,964,573 A | 10/1990 | Lipski | |
| 4,997,007 A | 3/1991 | Niemann et al. | |
| 5,329,650 A | 7/1994 | Zaccai et al. | |
| 5,339,469 A | 8/1994 | Gilles | |
| 5,353,448 A | 10/1994 | Lee | |
| 5,678,258 A | 10/1997 | Healy | |
| 5,742,961 A | 4/1998 | Casperson et al. | |
| 5,870,781 A | 2/1999 | Williams | |
| 6,038,715 A | 3/2000 | Flieger et al. | |
| 6,192,529 B1 | 2/2001 | Jones et al. | |
| 6,349,428 B1 | 2/2002 | Nasr et al. | |
| D454,620 S | 3/2002 | Starck | |
| 6,378,912 B1 | 4/2002 | Condon et al. | |
| 6,438,767 B1 | 8/2002 | Warshawsky | |
| 6,550,079 B2 | 4/2003 | Gransow et al. | |
| D477,657 S | 7/2003 | Toyohara | |
| 6,726,161 B2 | 4/2004 | Plump et al. | |
| D500,121 S | 12/2004 | Blomstrom | |
| 6,829,790 B2 | 12/2004 | Petrovic et al. | |
| 6,859,955 B2 | 3/2005 | Hudson | |
| D514,197 S | 1/2006 | Gilbert | |
| 7,043,776 B1 | 5/2006 | Wu | |
| 7,114,202 B1 | 10/2006 | Padrick | |
| 7,219,376 B1 | 5/2007 | Zhou | |
| D545,419 S | 6/2007 | Nikles et al. | |
| D552,722 S | 10/2007 | Nikles et al. | |
| 7,310,836 B2 | 12/2007 | Glunk | |
| D559,949 S | 1/2008 | Bickler et al. | |
| D562,950 S | 2/2008 | Nikles et al. | |
| D562,951 S | 2/2008 | Nikles et al. | |
| D564,625 S | 3/2008 | Bickler et al. | |
| D567,904 S | 4/2008 | Schonherr et al. | |
| 7,356,857 B2 | 4/2008 | Rosenberg | |
| D575,846 S | 8/2008 | Lobermeier et al. | |
| 7,406,984 B2 | 8/2008 | Nikles et al. | |
| 7,458,112 B1 | 12/2008 | Yang | |
| 7,578,453 B1 | 8/2009 | Wilson | |
| D606,627 S | 12/2009 | Urquiola | |
| 7,657,949 B2 | 2/2010 | Zhadanov et al. | |
| D612,453 S | 3/2010 | Schoenherr et al. | |
| D616,066 S | 5/2010 | Cummings et al. | |
| 7,766,291 B2 | 8/2010 | Eilmus et al. | |
| D629,867 S | 12/2010 | Rexach et al. | |
| 7,857,241 B2 | 12/2010 | Deng | |
| D638,100 S | 5/2011 | Juan | |
| D638,520 S | 5/2011 | Matsuura et al. | |
| 7,937,784 B2 | 5/2011 | Qiu | |
| 8,156,579 B2 | 4/2012 | Renfrew | |
| 8,191,185 B2 | 6/2012 | Tsai | |
| 8,683,624 B1 | 4/2014 | Zhadanov et al. | |
| 9,145,665 B2 | 9/2015 | Bors et al. | |
| 9,273,452 B2 * | 3/2016 | Wilson | E03C 1/0408 |
| 9,677,256 B2 * | 6/2017 | Wilson | E03C 1/025 |
| 10,024,038 B2 * | 7/2018 | Wilson | E03C 1/025 |
| 10,245,610 B2 | 4/2019 | Johnson | |
| 10,422,113 B2 * | 9/2019 | Wilson | E03C 1/066 |
| 10,655,310 B2 * | 5/2020 | Lee | B05B 1/18 |
| 11,174,627 B2 * | 11/2021 | Wilson | E03C 1/021 |
| 2002/0083518 A1 | 7/2002 | D'Ugo | |
| 2003/0226200 A1 | 12/2003 | Charonis | |
| 2004/0118949 A1 | 6/2004 | Marks | |
| 2005/0103895 A1 | 5/2005 | Fujii et al. | |
| 2005/0116062 A1 | 6/2005 | Yang | |
| 2005/0127211 A1 | 6/2005 | Yeiser | |
| 2006/0021131 A1 | 2/2006 | Robert et al. | |
| 2006/0196972 A1 | 9/2006 | Kajuch | |
| 2009/0000022 A1 | 1/2009 | Phipps et al. | |
| 2009/0082706 A1 | 3/2009 | Shaw | |
| 2009/0202293 A1 | 8/2009 | Kajuch et al. | |
| 2009/0249540 A1 | 10/2009 | Pan | |
| 2009/0255588 A1 | 10/2009 | Bors et al. | |
| 2010/0024909 A1 | 2/2010 | Lu et al. | |
| 2010/0058532 A1 | 3/2010 | Tsai et al. | |
| 2010/0163652 A1 | 7/2010 | Kajuch et al. | |
| 2010/0180376 A1 | 7/2010 | Deng | |
| 2010/0276020 A1 | 11/2010 | Fan et al. | |
| 2011/0142529 A1 | 6/2011 | Oh et al. | |
| 2012/0151669 A1 | 6/2012 | Wilson | |
| 2012/0255114 A1 | 10/2012 | Reeves et al. | |
| 2018/0347160 A1 * | 12/2018 | Wilson | E03C 1/066 |
| 2020/0018051 A1 * | 1/2020 | Wilson | E03C 1/0408 |
| 2022/0056679 A1 * | 2/2022 | Wilson | F16K 11/085 |

FOREIGN PATENT DOCUMENTS

| | | |
|---|---|---|
| CN | 1346619 A | 5/2002 |
| CN | 101163838 A | 4/2008 |
| CN | 201074346 Y | 6/2008 |
| CN | 101426984 A | 5/2009 |
| CN | 201248644 Y | 6/2009 |
| CN | 201537035 U | 8/2010 |
| CN | 201672099 U | 12/2010 |
| DE | 3807846 A1 | 9/1989 |
| DE | 4204308 A1 | 8/1993 |
| DE | 20319171 U1 | 2/2004 |
| EM | 000408349-0001 | 9/2005 |
| EM | 000408349-0002 | 9/2005 |
| EM | 000408349-0003 | 9/2005 |
| EM | 000408349-0004 | 9/2005 |
| EM | 000408349-0005 | 9/2005 |
| EM | 000408349-0006 | 9/2005 |
| EM | 000408349-0007 | 9/2005 |
| EM | 000408349-0008 | 9/2005 |
| EP | 0076717 A1 | 4/1983 |
| EP | 1405955 A2 | 4/2004 |
| EP | 1892339 A1 | 2/2008 |
| EP | 2154297 A2 | 2/2010 |
| GB | 2109226 A | 6/1983 |
| JP | H09125476 A | 5/1997 |
| WO | 2005031073 A1 | 4/2005 |

(56) References Cited

FOREIGN PATENT DOCUMENTS

| WO | 2009038296 A2 | 3/2009 |
|----|---------------|--------|
| WO | 2010012134 A1 | 2/2010 |

OTHER PUBLICATIONS

Pulse Showerspas Product Line, Pulse Showerspas, Inc., 2010, Retrieved from Internet on Nov. 19, 2010 <URL: http://www.pulseshowerspas.com/product_line.htrn>.
PCT/US2011/0655541 International Search Report and Written Opinion dated Apr. 16, 2012 (8 pages).
Notice of Allowance from the U.S. Appl. No. 29/381,835 dated Apr. 4, 2012 (9 pages).
Raindance Connect Product Data Sheet, Hansgrohe USA, Known at least as early as Nov. 8, 2010, Retrieved from Internet on Mar. 21, 2012 <URL: http://www.hansgrohe-usa.com/pdf?datasheel .pdf? model~27I64USA&categorrCOOOOOOOOOOO09& 1 ang~en_ US>.
Raindance Allrounder AIR Product Data Sheet, Hansgrohe USA, Known at least as early as Nov. 8, 2010, Retrieved from Internet on Mar. 21, 2012 <URL:http://www.hansgrohe-usa.com/pdf/datasheel. pdf? model~2811 OUSA&categorrC0000000000081 &lang~en_ US>.
Raindance S Wallbar Product Data Sheet, Hansgrohe USA, Known at least as early as Nov. 8, 2010, Retrieved from Internet on Mar. 21, 2012 <URL: http://www.hansgrohe-usa.com/pdf/datasheel.pdf? model~27876USA&categorrC0000000000081 &lang~en US.
Freehander Spec Sheet, Grohe, Known at least as early as Nov. 8, 2010, Retrieved from Internet on Mar. 21, 2012 <URL: http://www.groheamerica.com/hllib/0/catalogue_appendage/us_specification/27007 -freehanderpdf>.
Euphoria Shower System Spec Sheet, Grohe, Known at least as early as Nov. 8, 2010, Retrieved from Internet on Mar. 21, 2012 <URL: http://www.groheamerica.com/htlib/O/ catalogue_appendage/us_specification/27 421-euphoria.pd! >.
Rainshower Shower System Spec Sheet, Grohe, Known at least as early as Nov. 8, 2010, Retrieved from Internet on Mar. 21, 2012 <URL: http://www.groheamerica.com/htlib/O/catalogue_appendage/us_specification/27031- rainshower.pdf>.
Kauai 11, Pulse Shower Spas, Known at least as early as Nov. 8, 2010, Retrieved from Internet on Mar. 15, 2012 <URL: http://pulseshowerspas.com/pulseshowerspas_kauai.htm>.
First Office Action from The State Intellectual Property Office of the People's Republic of China for Application No. 201410374106.8 dated Jan. 25, 2016 (7 pages).
First Office Action from The State Intellectual Property Office of the People's Republic of China for Application No. 201410374353.8 dated Jan. 15, 2016 (7 pages).
First Office Action from The State Intellectual Property Office of the People's Republic of China for Application No. 201410373102.8 dated Feb. 1, 2016 (7 pages).
Extended European Search Report from the European Patent Office for Application No. 11849778.3 dated Aug. 9, 2016 (9 pages).
PULSE Showerspas, "Kauai II Rain Shower System Installation Instructions", Manufacturer's Warranty, PULSE Showerspas, Inc., Jan. 23, 2017, 2 pages, Warsonville, California.
PULSE Showerspas, "Kauai-1011 II", website search, Jan. 23, 2017, 5 pages, https://www.pulseshowerspas.com/index.php/product/kauai/.
Internet Archive WayBackMachine, "PULSE Showerspas", website search, 2007, 1 page, https://web.archive.org/web/20080 5040 5 I 432/http:/www.pulseshowerspas.com/.
Internet Archive WayBackMachine, "Dec. 2007 Remodeler Product Review", website review, Dec. 1, 2007, 7 pages, https://web.archive.org/web/20080629001747 /http://www.housingzone.com/proremodeler/article/CA650949 I .html.
Internet Archive WayBackMachine, "PULSE Showerspas in the News", website article, 2007, 5 pages, https://web.archive.org/web/20080 5 27233 I 58/http://www. pulseshowerspas.corn/newsandevents.htm.

"The Essential P&P Apr. 2005 Product Guide & Retail Price List", Bristan Showers Taps Accessories, Apr. 2005, 3 pages.
European Patent Office Action for Application No. 11849778.3 dated Oct. 27, 2017 (4 pages).
International Code Council, Inc., "International Plumbing Code," 2009, (6 pages).
Curriculum Vitae of Julius Ballanco, President of JB Engineering and Code Consulting, P.C., dated May 10, 2018, (1 page).
Expert Declaration of Julius Ballanco for Inter Partes Review of U.S. Pat. No. 9,677,256, United States Patent Office, Case No. IPR2018-01053, dated May 9, 2018, (129 pages).
Petition for Inter Partes Review of Claims 7-16 of U.S. Pat. No. 9,677,256, United States Patent Office, Case No. IPR2018-01053, dated May 10, 2018, (77 pages).
European Patent Office Action for Application No. 11849778.3 dated May 3, 2018 (4 pages).
European Patent Office Action for Application No. 18162241.6 dated Jun. 12, 2018 (10 pages).
European Patent Office Action for Application No. 18162239.0 dated Jun. 11, 2018 (9 pages).
US Patent Trial and Appeal Board Final Decision On Petition under 35 U.S.C. § 311 Requesting Inter Partes Review Case No. IPR2018-01053 of related U.S. Pat. No. 9,677,256 issued Aug. 12, 2019 (36 pages).
Kohler Co., Exhibit 2005 for Inter Partes Review of U.S. Pat. No. 9,677,256, United States Patent Office, Case No. IPR2018-01053. Transcript of Oral Deposition of Julius Ballanco, Oct. 18, 2018 (50 pages).
Kohler Co., Exhibit 2009 for Inter Partes Review of U.S. Pat. No. 9,677,256, United States Patent Office, Case No. IPR2018-01053. Kohler, "Easy to Install Kohler HydroRail Shower Column Transforms a Standard Shower into a Luxurious Showering Experience," Feb. 8, 2012 (2 pages).
Kohler Co., Exhibit 2010 for Inter Partes Review of U.S. Pat. No. 9,677,256, United States Patent Office, Case No. IPR2018-01053. Kohler, "HydroRail, Shower Columns," 2015 (16 pages).
Kohler Co., Exhibit 2011 for Inter Partes Review of U.S. Pat. No. 9,677,256, United States Patent Office, Case No. IPR2018-01053. Kohler, "HydroRail-R, Shower Column, K-45212," Jun. 20, 2018 (2 pages).
Kohler Co., Exhibit 2012 for Inter Partes Review of U.S. Pat. No. 9,677,256, United States Patent Office, Case No. IPR2018-01053. Kohler, "Installation and Care Guide, Shower Column" 2013 (68 pages).
Kohler Co., Exhibit 2013 for Inter Partes Review of U.S. Pat. No. 9,677,256, United States Patent Office, Case No. IPR2018-01053. Kohler, "Westin Hotels & Resorts, Heavenly Shower II," May 10, 2018 (5 pages).
Kohler Co., Exhibit 2014 for Inter Partes Review of U.S. Pat. No. 9,677,256, United States Patent Office, Case No. IPR2018-01053. One Week Bath, "Kitchen & Bath Industry Showcase 2012: Top 3 New Products," Apr. 30, 2012 (3 pages).
Kohler Co., Exhibit 2015 for Inter Partes Review of U.S. Pat. No. 9,677,256, United States Patent Office, Case No. IPR2018-01053. Designs by bsb, "Best of KBIS 2012," 2012 (2 pages).
Kohler Co., Exhibit 2016 for Inter Partes Review of U.S. Pat. No. 9,677,256, United States Patent Office, Case No. IPR2018-01053. Consumer Reports, "Builders' Show: A custom shower at off-the-shelf prices," Feb. 8, 2012 (1 page).
Kohler Co., Exhibit 2017 for Inter Partes Review of U.S. Pat. No. 9,677,256, United States Patent Office, Case No. IPR2018-01053. Architecture Design, "Introducing Kohler's Hydrorail showering," 2017 (2 pages).
Kohler Co., Exhibit 2019 for Inter Partes Review of U.S. Pat. No. 9,677,256, United States Patent Office, Case No. IPR2018-01053. New Zealand Hardware Journal, "Is this the Ultimate Shower Renovation Solution?" Dec. 8, 2017 (1 page).
Kohler Co., Exhibit 2020 for Inter Partes Review of U.S. Pat. No. 9,677,256, United States Patent Office, Case No. IPR2018-01053. Moen, "Simply Install Multiple Showerheads with Moen's First Shower Rail System," Jan. 2016 (3 pages).

(56) References Cited

OTHER PUBLICATIONS

Kohler Co., Exhibit 2021 for Inter Partes Review of U.S. Pat. No. 9,677,256, United States Patent Office, Case No. IPR2018-01053. Moen, "Annex Shower Rail with Two-Function Diverter," 2016 (2 pages).
Kohler Co., Exhibit 2022 for Inter Partes Review of U.S. Pat. No. 9,677,256, United States Patent Office, Case No. IPR2018-01053. Moen, "Annex chrome shower only valve trim," Nov. 12, 2016 (3 pages).
Kohler Co., Exhibit 2023 for Inter Partes Review of U.S. Pat. No. 9,677,256, United States Patent Office, Case No. IPR2018-01053. Moen, "Specifications, Annex Shower Rail, Model: TS3661HN," Jun. 10, 2016 (1 page).
Kohler Co., Exhibit 2024 for Inter Partes Review of U.S. Pat. No. 9,677,256, United States Patent Office, Case No. IPR2018-01053. Moen, "Illustrated Parts, Annex Shower Rail," Nov. 15, 2017 (1 page).
Kohler Co., Exhibit 2025 for Inter Partes Review of U.S. Pat. No. 9,677,256, United States Patent Office, Case No. IPR2018-01053. Moen, "Installation Guide, Annex Shower Rail," Jun. 7, 2016 (12 pages).
Kohler Co., Exhibit 2026 for Inter Partes Review of U.S. Pat. No. 9,677,256, United States Patent Office, Case No. IPR2018-01053. Patent Assignment from Mark S. Bors et al. to Moen Incorporated, executed Apr. 10, 2008 (7 pages).
Kohler Co., Exhibit 2027 for Inter Partes Review of U.S. Pat. No. 9,677,256, United States Patent Office, Case No. IPR2018-01053. Excerpts of International Building Code, 2000 (4 pages).
Kohler Co., Exhibit 2028 for Inter Partes Review of U.S. Pat. No. 9,677,256, United States Patent Office, Case No. IPR2018-01053. Excerpts of International Building Code, 2009 (4 pages).
Patent Owner's Response for Inter Partes Review of U.S. Pat. No. 9,677,256, United States Patent Office, Case No. IPR2018-01053, Nov. 5, 2018 (74 pages).
Kohler Co., Exhibit 2018 for Inter Partes Review of U.S. Pat. No. 9,677,256, United States Patent Office, Case No. IPR2018-01053. Professional Builder, "Top 100 Products," Aug. 2017 (19 pages).
Kohler Co., Exhibit 2007 for Inter Partes Review of U.S. Pat. No. 9,677,256, United States Patent Office, Case No. IPR2018-01053. Declaration of John M. Wilson, Nov. 2, 2018 (14 pages).
Kohler Co., Exhibit 2003 for Inter Partes Review of U.S. Pat. No. 9,677,256, United States Patent Office, Case No. IPR2018-01053. Declaration of Matthew Stein, Nov. 5, 2018 (94 pages).
Kohler Co., Exhibit 2042 for Inter Partes Review of U.S. Pat. No. 9,677,256, United States Patent Office, Case No. IPR2018-01053. Declaration of Anupa Maru, Nov. 2, 2018 (7 pages).
Kohler Co., Exhibit 2041 for Inter Partes Review of U.S. Pat. No. 9,677,256, United States Patent Office, Case No. IPR2018-01053. Declaration of Leslie Petch, Nov. 2, 2018 (13 pages).
Kohler Co., Exhibit 2029 for Inter Partes Review of U.S. Pat. No. 9,677,256, United States Patent Office, Case No. IPR2018-01053. Excerpts of 28 CFR, Part 36, Appendix A, 1992 (6 pages).
Kohler Co., Exhibit 2030 for Inter Partes Review of U.S. Pat. No. 9,677,256, United States Patent Office, Case No. IPR2018-01053. Excerpts of Federal Register, vol. 69, No. 141, Jul. 23, 2004 (5 pages).
Kohler Co., Exhibit 2004 for Inter Partes Review of U.S. Pat. No. 9,677,256, United States Patent Office, Case No. IPR2018-01053. Presentation of Qualifications of Matthew I Stein, P.E., May 10, 2018 (16 pages).
Kohler Co., Exhibit 2031 for Inter Partes Review of U.S. Pat. No. 9,677,256, United States Patent Office, Case No. IPR2018-01053. Excerpts of 36 CFR, Part 1191, 2009 (5 pages).
Kohler Co., Exhibit 2032 for Inter Partes Review of U.S. Pat. No. 9,677,256, United States Patent Office, Case No. IPR2018-01053. Excerpts of The American Heritage Dictionary, 5th Edition, 2011 (4 pages).
Kohler Co., Exhibit 2040 for Inter Partes Review of U.S. Pat. No. 9,677,256, United States Patent Office, Case No. IPR2018-01053. Kohler, "Persona, Two-way Shower Arm Diverter, K-9662," Sep. 28, 2018 (2 pages).
Kohler Co., Exhibit 2039 for Inter Partes Review of U.S. Pat. No. 9,677,256, United States Patent Office, Case No. IPR2018-01053. Kohler, "Awaken B110, Deluxe Slidebar Kit, K-99243-G," Sep. 28, 2018 (2 pages).
Kohler Co., Exhibit 2033 for Inter Partes Review of U.S. Pat. No. 9,677,256, United States Patent Office, Case No. IPR2018-01053. Excerpts of Merriam-Webster's Collegiate Dictionary, 11th Edition, 2007, (4 pages).
Kohler Co., Exhibit 2034 for Inter Partes Review of U.S. Pat. No. 9,677,256, United States Patent Office, Case No. IPR2018-01053. Excerpts of Webster's Third New International Dictionary of the English Language, 2002 (3 pages).
Kohler Co., Exhibit 2035 for Inter Partes Review of U.S. Pat. No. 9,677,256, United States Patent Office, Case No. IPR2018-01053. Moen, "The Plumber's Guide to M-PACT Roman Tub Valves Featuring the New Dura-Grip Mounting System," 2012 (8 pages).
Kohler Co., Exhibit 2036 for Inter Partes Review of U.S. Pat. No. 9,677,256, United States Patent Office, Case No. IPR2018-01053. Lu et al., U.S. Patent Publication No. 2010/0024909, Feb. 4, 2010 (12 pages).
Kohler Co., Exhibit 2037 for Inter Partes Review of U.S. Pat. No. 9,677,256, United States Patent Office, Case No. IPR2018-01053. Moen, "Annex Chrome Shower Only Valve Trim, Model TS3661HN," <https://www.moen.com/products/Annex/Annex_Chrome_shower_only_valve_trim/TS3661NH> webpage accessed Nov. 5, 2018.
Kohler Co., Exhibit 2038 for Inter Partes Review of U.S. Pat. No. 9,677,256, United States Patent Office, Case No. IPR2018-01053. Moen, "Two-Handle Roman Tub Valve, Installation Guide" Apr. 2008 (6 pages).
Patent Owner Preliminary Response for Inter Partes Review of U.S. Pat. No. 9,677,256, United States Patent Office, Case No. IPR2018-01053, dated Jul. 6, 2018 (4 pages).
Decision Granting Institution of Inter Partes Review 35 U.S.C § 314 of U.S. Pat. No. 9,677,256, United States Patent Office, Case No. IPR2018-01053, dated Aug. 13, 2018 (15 pages).
Scheduling Order 37 C.F.R. § 42.51 for Inter Partes Review of U.S. Pat. No. 9,677,256, United States Patent Office, Case No. IPR2018-01053, dated Aug. 13, 2018 (8 pages).

\* cited by examiner

SHOWER BAR SYSTEM

RELATED APPLICATION

The present application is a continuation of U.S. patent application Ser. No. 16/581,071, filed Sep. 24, 2019, which is a continuation of U.S. patent application Ser. No. 15/997,471, filed Jun. 4, 2018, now U.S. Pat. No. 10,422,113, which is a continuation of U.S. patent application Ser. No. 15/586,139, filed May 3, 2017, now U.S. Pat. No. 10,024,038, which is a continuation of U.S. patent application Ser. No. 15/056,642, filed Feb. 29, 2016, now U.S. Pat. No. 9,677,256, which is a continuation of U.S. patent application Ser. No. 13/328,832, filed Dec. 16, 2011, now U.S. Pat. No. 9,273,452, which claims priority to U.S. Provisional Patent Application No. 61/424,539, filed Dec. 17, 2010, the entire contents of which are hereby incorporated by reference.

FIELD

The present invention relates shower systems and, more particularly, to a shower bar system.

BACKGROUND

Shower bar systems are common in many showers and bathing facilities. Shower bar systems typically include a showerhead and a vertical bar, often called a shower bar. The shower bar may be aesthetically pleasing and/or may be used as a grab bar by users.

SUMMARY

In one independent embodiment, a shower system is connectable to a water supply, the water supply including a supply pipe having a pipe outlet, and the shower system may generally include an adjustable supply assembly fluidly connectable to the supply pipe, a shower bar fluidly connectable to the supply assembly and a shower member fluidly connectable to the shower bar to dispense water from the water supply. The supply assembly may include an adapter defining an axis and having an inlet coupleable to the pipe outlet, a supply member having a supply outlet and coupled in fluid communication with the adapter, the supply member being coupled to the adapter for movement along the axis to adjust a distance between the pipe outlet and the supply outlet, and a seal positioned and operable to provide a sealed connection between the adapter and the supply member in adjusted positions the supply member relative to the adapter. The shower bar may include a shower pipe having a shower pipe inlet coupleable to the supply outlet and a shower pipe outlet, the shower pipe inlet being coupleable to the supply outlet in a position a first distance from the pipe outlet, the supply member being movable relative to the pipe outlet to position the supply outlet at the first distance.

In some embodiments, the shower system is mounted in an enclosure having a wall. The supply pipe is located on one side of the wall, and the shower bar is located on the other side of the wall. The supply assembly may further include a mounting collar engageable with the other side of the wall, the supply member being coupled to the mounting collar to support shower bar.

The supply member may be slidably coupled to the adapter. The seal may include an o-ring between the adapter and the supply member. The adapter may be threadedly coupled to the supply pipe.

In another independent embodiment, a shower system may generally include a first shower member fluidly connectable to and operable to dispense water from the water supply, the first shower member having a first shower member inlet, a second shower member fluidly connectable to and operable to dispense water from the water supply, the second shower member having a second shower member inlet, a shower bar assembly fluidly connectable to the water supply, and a transfer valve assembly coupleable to the shower bar assembly and operable to selectively direct water to the first shower member and to the second shower member. The shower bar assembly may include a main supply pipe having a supply inlet fluidly connectable to the pipe outlet and a supply outlet, a return pipe having a return inlet and a return outlet fluidly connected to the first shower member inlet, and an outer pipe surrounding the main supply pipe and the return pipe, a gap being provided between the outer supply pipe, the main supply pipe and the return pipe. The transfer valve assembly may include a valve body defining a valve inlet fluidly connectable to the supply outlet, a first valve outlet fluidly connectable to the return inlet, and a second valve outlet fluidly connected to the second shower member inlet, a valve member positioned in the valve body for adjustment between a first condition, in which the valve inlet is in fluid communication with the first valve outlet and is not in fluid communication with the second valve outlet, and a second condition, in which the valve inlet is in fluid communication with the second valve outlet and is not in fluid communication with the first valve outlet, and an actuator operable to adjust the valve member between the first condition and the second condition.

In some embodiments, the first shower member is a showerhead, and the second shower member is a handshower. The handshower may include a hose having an inlet coupled to the second valve outlet. The valve member may be pivotable between the first condition and the second condition. The actuator may include a handle engageable by a user.

In yet another independent embodiment, a handshower system may generally include a shower supply pipe having a supply inlet fluidly connectable to the pipe outlet and a supply outlet, the shower supply pipe extending along an axis and being positioned with the axis oriented generally vertically, a connector having a connector inlet fluidly connected to the supply outlet and a connector outlet, the connector outlet defining an outlet axis, the outlet axis being angled relative to the axis of the shower supply pipe, a hose having a hose inlet fluidly connected to the connector outlet and a hose outlet, the hose having a first portion proximate the hose inlet, the first portion generally extending along the outlet axis and being angled relative to the axis of the shower supply pipe, and a handshower member coupled to the hose outlet, water from the water supply being dispensed through the handshower member.

In some embodiments, the outlet axis may be angled about 45 degrees from the axis of the shower supply pipe. The connector may be pivotally coupled to the shower supply pipe for pivoting movement about the axis of the shower supply pipe. A handshower support member may be operable to support the handshower along the shower supply pipe. An outer pipe may surround the shower supply pipe, and the support member may be slidable along the outer pipe. The support member may be coupled to the outer pipe for pivoting movement about the axis of the shower supply pipe.

In a further independent embodiment, a transfer valve assembly for a shower system may generally include a body, a valve member supported by the body, and an actuator. The body may define a first inlet, a second inlet, a first outlet fluidly connectable to the first water dispensing apparatus and a second outlet fluidly connectable to the second water dispensing apparatus, in a first configuration of the transfer valve, the first inlet being fluidly connected to a water supply with a pipe outlet at a first height and the second inlet not being fluidly connected to a water supply, in a second configuration of the transfer valve, the first inlet not being fluidly connected to a water supply and the second inlet being fluidly connected to a water supply with a pipe outlet at a second height different that the first height. The valve member may be adjustable between a first condition, in which the first outlet is fluidly connected to the water supply, and a second condition, in which the second outlet is fluidly connected to the water supply. The actuator may be operable to adjust the valve member between the first condition and the second condition.

In some embodiments, in the first configuration, the valve member has a wall preventing fluid communication between the first inlet and the second inlet and defines a cavity in fluid communication with the first inlet, in the first condition, the cavity fluidly communicates with the first outlet, in the second condition, the cavity fluidly communicates with the second outlet. In the second configuration, a plug prevents fluid communication between the first inlet and the second inlet, and wherein the valve member defines a cavity in fluid communication with the second inlet, in the first condition, the cavity fluidly communicates with the first outlet, in the second condition, the cavity fluidly communicates with the second outlet. The valve member may be pivotable between the first condition and the second condition. The actuator may include a handle engageable by a user.

In another independent embodiment, a shower system may generally include a water dispensing apparatus and a pipe arrangement defining a first inlet, a second inlet, and an outlet fluidly connected to the water dispensing apparatus, in a first configuration of the pipe arrangement, the first inlet being fluidly connected to a water supply with a pipe outlet at a first height, and the second inlet not being fluidly connected to a water supply, in a second configuration of the pipe arrangement, the first inlet not being fluidly connected to a water supply, and the second inlet being fluidly connected to a water supply with a pipe outlet at a second height different that the first height.

In some embodiments, the pipe arrangement includes a first supply pipe providing the first inlet, and a second supply pipe providing the second inlet. The system may include a second water dispensing apparatus, and the pipe arrangement may define a second outlet fluidly connected to the second water dispensing apparatus. The pipe arrangement may include a transfer valve assembly including a transfer valve body providing the second inlet, the first outlet and the second outlet, a valve member positioned in the valve body for adjustment between a first condition, in which the valve inlet is in fluid communication with the first valve outlet and is not in fluid communication with the second valve outlet, and a second condition, in which the valve inlet is in fluid communication with the second valve outlet and is not in fluid communication with the first valve outlet, and an actuator operable to adjust the valve member between the first condition and the second condition.

Independent aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the accompanying drawings. The invention is capable of other independent embodiments and of being practiced or of being carried out in various ways.

Figure 1:
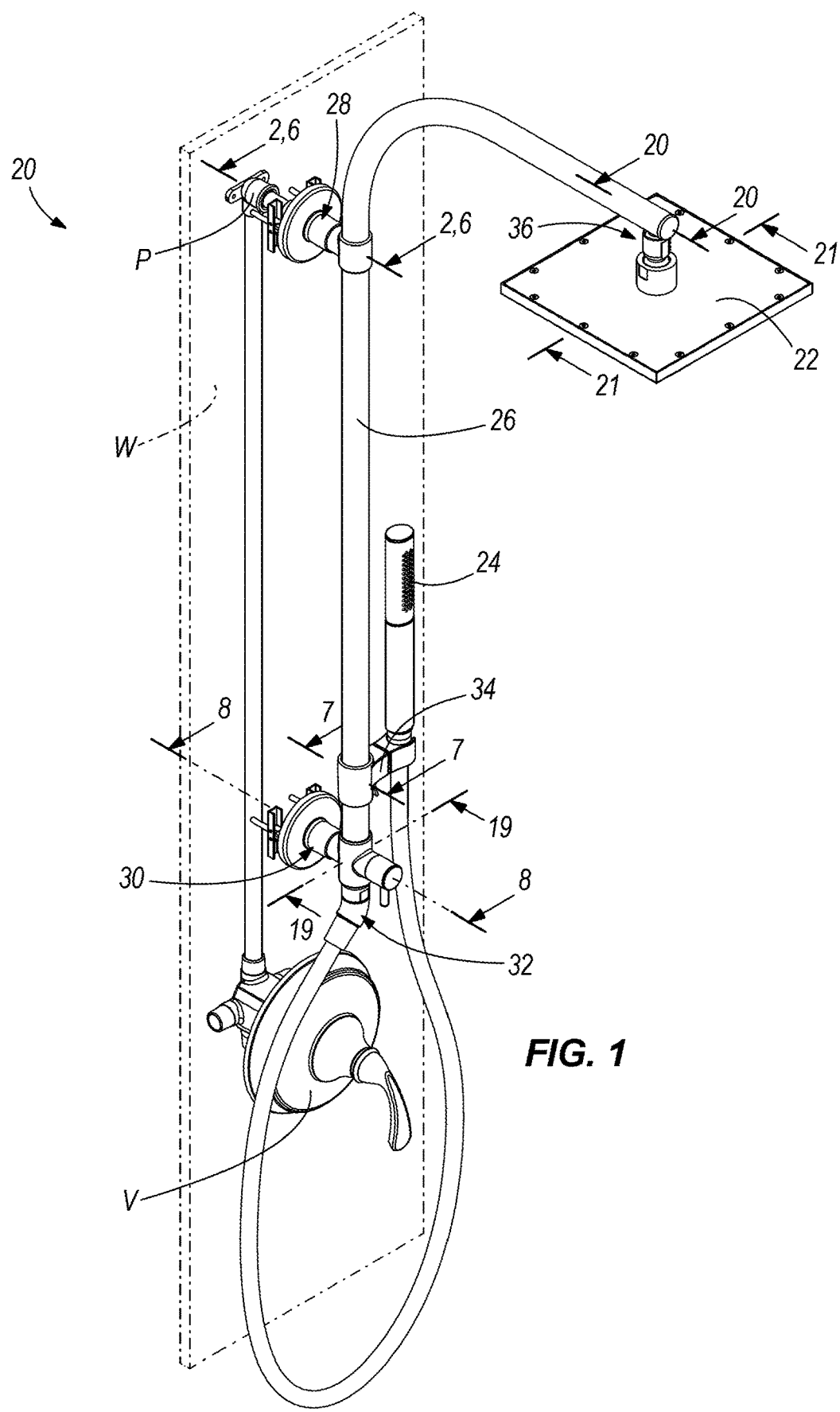
FIG. 1 is a perspective view of a shower bar system.

FIG. 1 illustrates a shower bar system 20 used with a showerhead 22 and a handshower 24. The shower bar system 20 is connectable to a water supply (e.g., household/residential, commercial, etc.). The illustrated shower bar system 20 generally includes a shower bar 26, an upper supply assembly 28, a transfer valve assembly 30, an angled hose connector 32, a bracket assembly 34 and a showerhead connection assembly 36.

Figure 2:
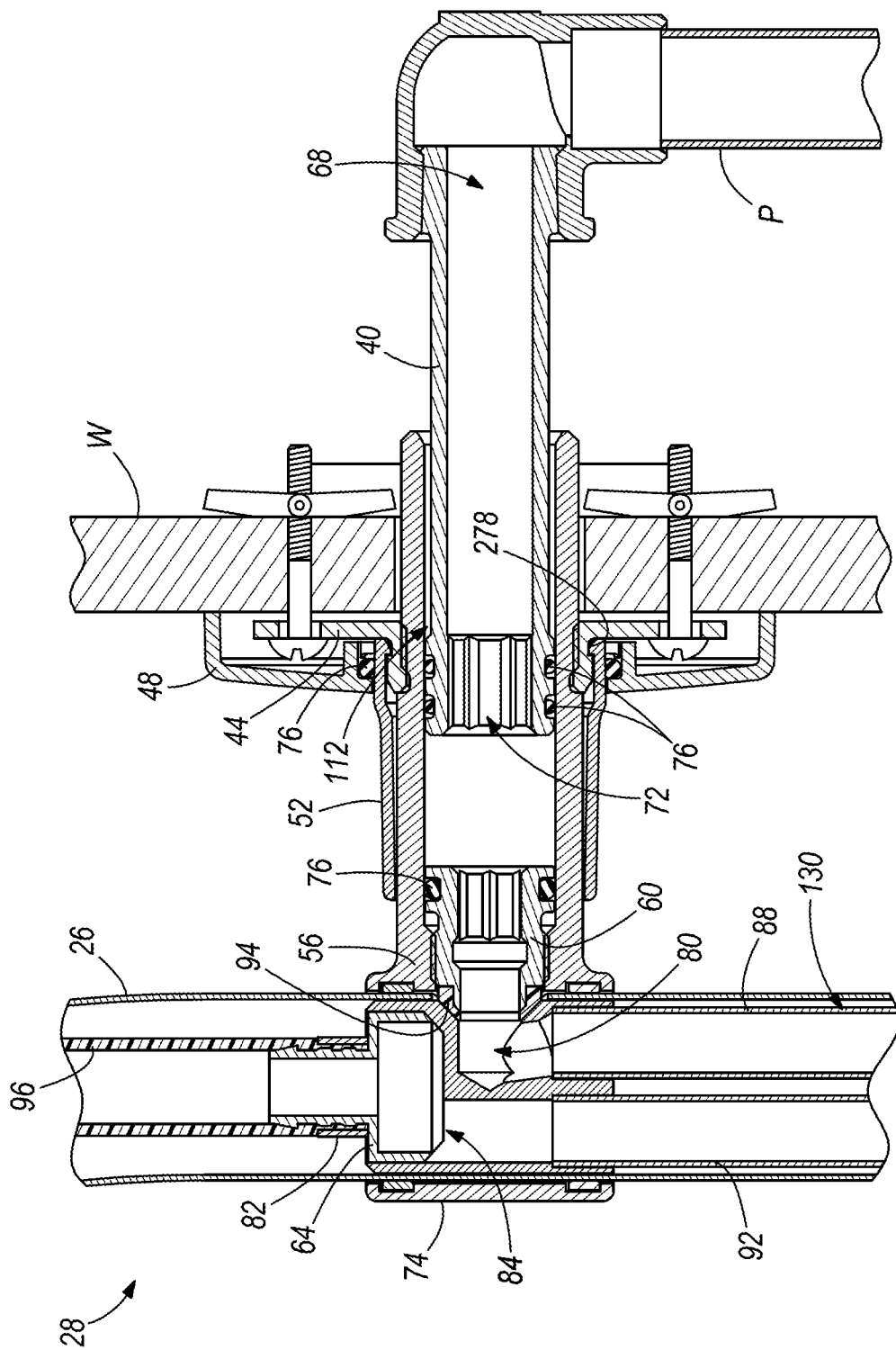
FIG. 2 is a sectional view of an upper supply assembly of the system shown in FIG. 1, taken along line 2-2 in FIG. 1.

The upper supply assembly 28, illustrated in section in FIG. 2, includes a supply adapter 40, a mounting collar 44, an escutcheon 48, a trim sleeve 52, an upper supply bracket 56, a supply connector 60, and an inlet connector 64.

The supply adapter 40 includes an inlet port 68 with threads to allow the supply adapter 40 to be coupled to a water supply pipe P. The supply adapter 40 also includes an outlet port 72 through which water exits the supply adapter 40 and enters the upper supply bracket 56. The interior of the outlet port 72 has a shape (e.g., hexagonal) to allow the supply adapter 40 to be rotated about an axis by a tool with a complementary-shaped head to threadedly couple the supply adapter 40 to the water supply pipe P.

The upper supply bracket 56 receives the outlet end of the supply adapter 40 at one end and, at the other end, has an annular portion 74. One or more seals 76 (e.g., o-rings) are disposed on the supply adapter 40 to seal the connection between the supply adapter 40 and the upper supply bracket 56. Each seal 76 may serve to provide a seal between two members and/or a friction fit inhibiting relative movement between two members. In other embodiments (not shown), different types of seals and/or frictional members may be used in the shower bar system 20. Also, in other embodiments (not shown), the outlet end of the supply adapter 40 may receive the supply bracket 56.

In the illustrated embodiment, the supply adapter 40 and the upper supply bracket 56 are axially slidable relative to one another while maintaining the sealed connection. Such relative sliding movement between the supply adapter 40 and the upper supply bracket 56 accommodates different wall thicknesses and/or variations in the depth of an existing water supply pipe P relative to the exterior portion of a shower wall W. The distance between the outlet of the water supply pipe P and the outlet of the upper supply bracket 56 is adjustable.

The supply connector 60 is positioned at least partially in the upper supply bracket 56. The illustrated supply connector 60 is generally cylindrical in shape and is hollow so that water may flow from the upper supply bracket 56 to the inlet connector 64. External threads on the supply connector 60 threadedly couple the supply connector 60 to the upper supply bracket 56. The interior of the supply connector 60 has a shape (e.g., hexagonal) to allow the supply connector 60 to be rotated about an axis by a tool with a complementary-shaped head. A seal 76 is disposed on the supply connector 60 to seal the connection between the supply connector 60 and the upper supply bracket 56. The supply connector 60 includes a tapered nose portion having a tapered seal 94 which partially projects into the annular portion 74 to interface with the inlet connector 64 and seal the connection between the supply connector 60 and the inlet connector 64. In other embodiments (not shown), other types of mating engagements are possible, such as a protrusion of the inlet connector 64 in mating engagement with a corresponding recess of the supply connector 60.

Figure 3:
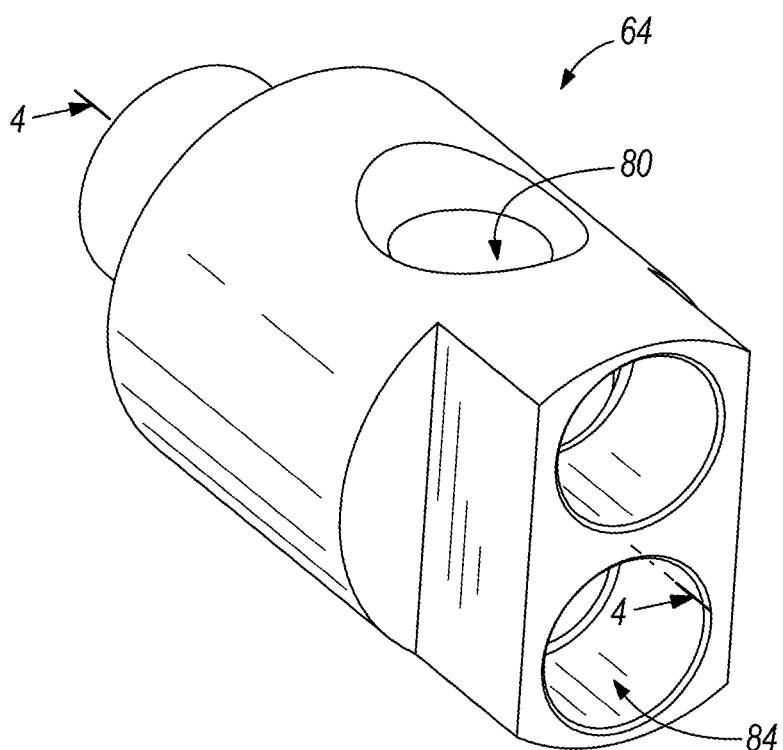
FIG. 3 is a perspective view of an inlet connector of the system shown in FIG. 1.
Figure 4:
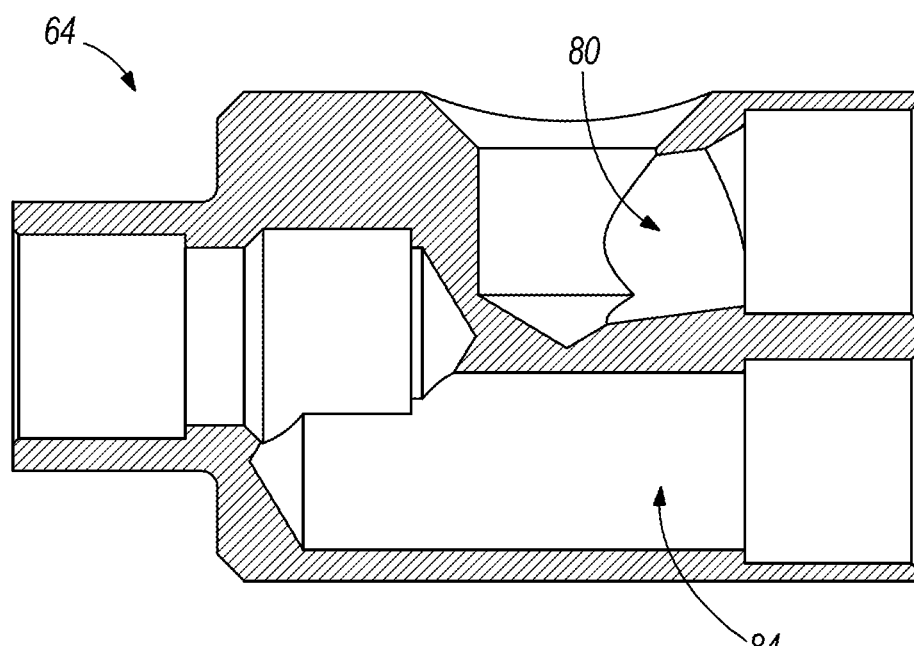
FIG. 4 is a sectional view of the inlet connector illustrated in FIG. 3, taken along line 4-4 in FIG. 3.

The inlet connector 64 (see FIGS. 2-4) is disposed in the shower bar 26 approximately in a location at which the shower bar 26 is received in the annular portion 74 of the upper supply bracket 56. The inlet connector 64 defines a first cavity 80 and a second cavity 84. The first cavity 80 is fluidly connected to the supply connector 60 and allows water to flow from the supply connector 60 to a main supply pipe or tube 88. As used herein, the term "pipe" should be understood to collectively refer to any pipe, tube, other conduit, etc. capable of transporting fluid. The second cavity 84 allows water to pass from a first showerhead pipe 92 to a second showerhead pipe 96. The second showerhead pipe 96 is secured onto a fitting with a stainless steel clamp ring 82. The pipes 88, 92, 96 provide a waterway assembly for the shower bar system 20.

Figure 5:
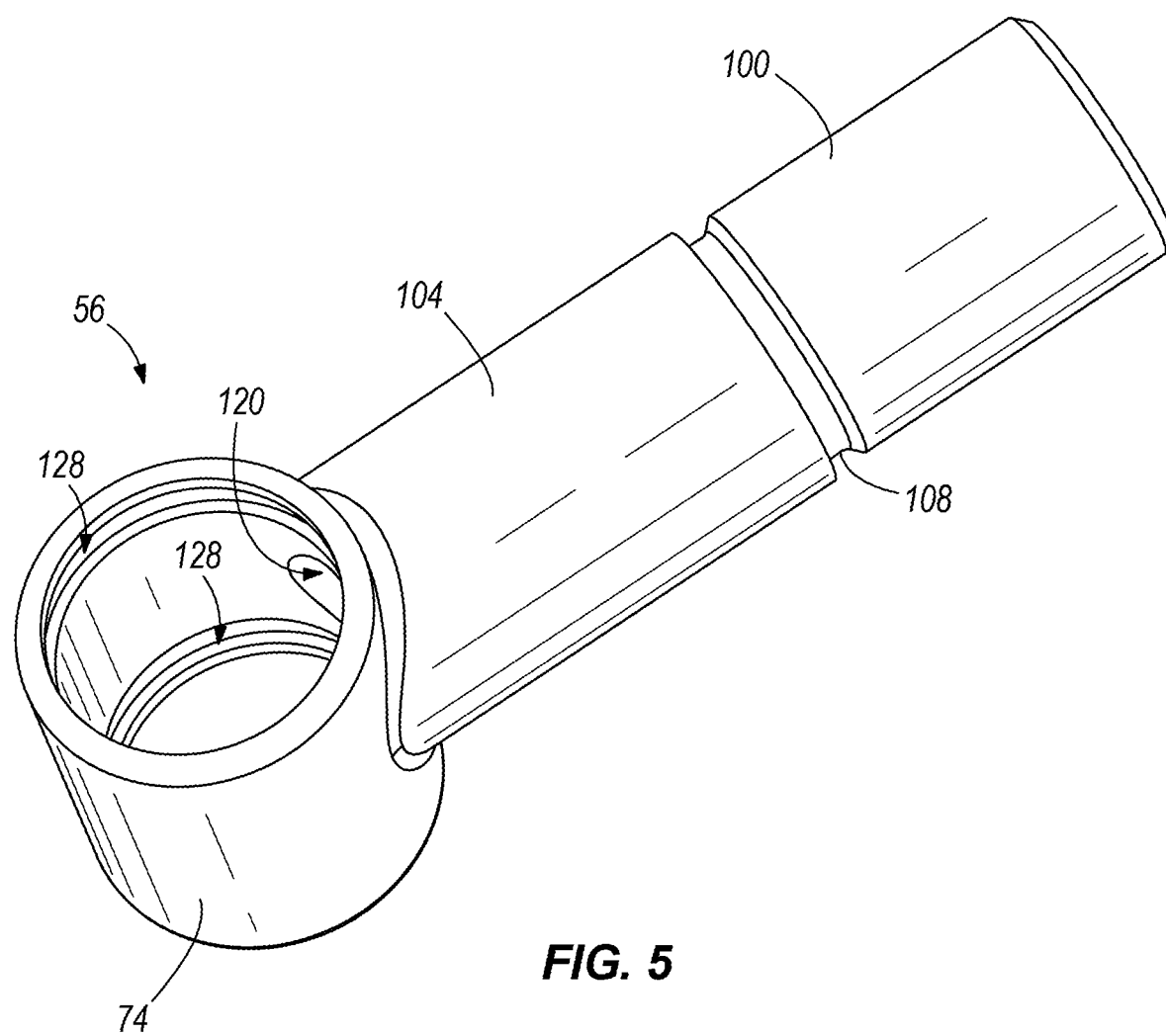
FIG. 5 is a perspective view of an upper supply bracket of the system shown in FIG. 1.

The upper supply bracket 56, illustrated in perspective in FIG. 5, includes a first cylindrical section 100 and a second cylindrical section 104 for assembly, as described below in more detail. In some embodiments (e.g. the illustrated embodiment), the diameter of the second cylindrical section 104 is greater than the diameter of the first cylindrical section 100. A groove 108 is disposed between the first cylindrical section 100 and the second cylindrical section 104. The first cylindrical section 100 is threaded. As shown in FIG. 2, the mounting collar 44 includes a circular opening 112 having a diameter approximately equal to the diameter of the upper supply bracket 56, and complementary threads are disposed on the circular opening 112, the purpose of which is explained below in more detail.

Figure 6:
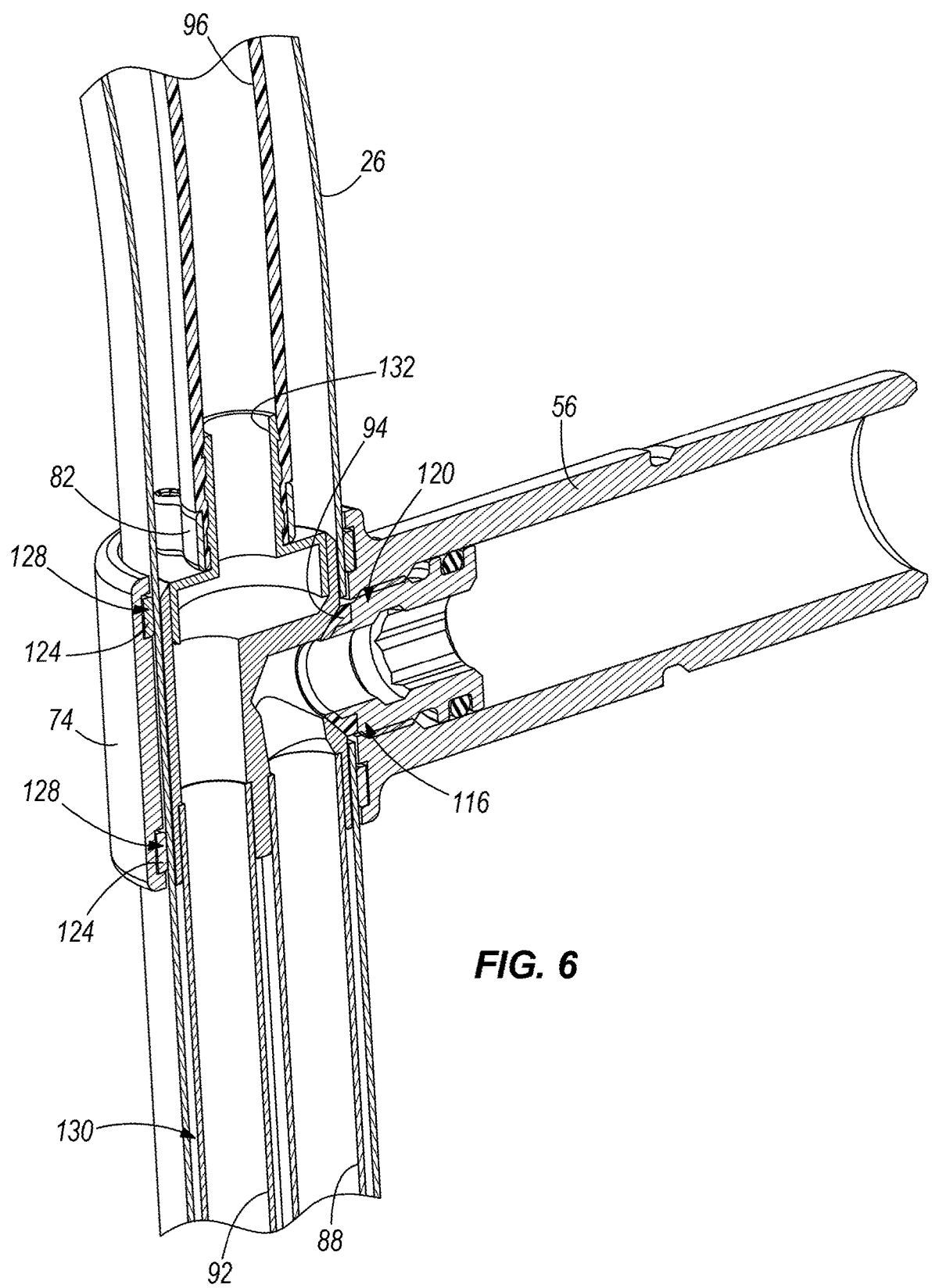
FIG. 6 is a sectional view of the upper supply assembly and a portion of a shower bar shown in FIG. 1, taken along line 6-6 in FIG. 1.
Figure 7:
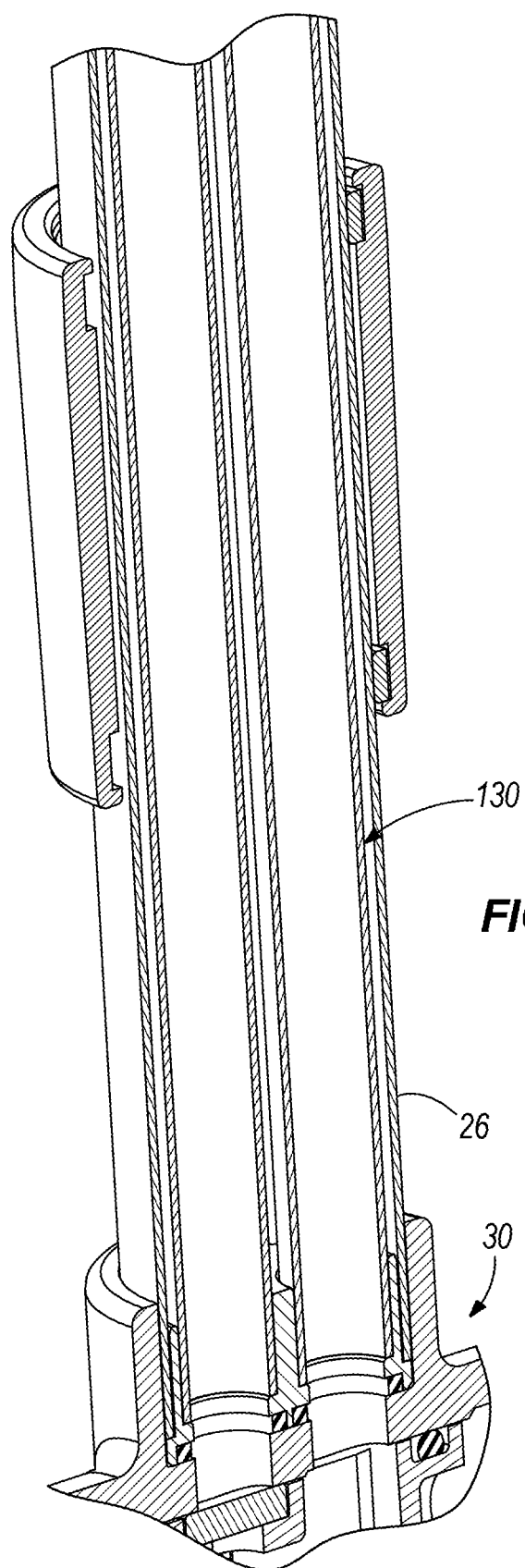
FIG. 7 is a sectional view of a portion of a transfer valve and a second portion of the shower bar illustrated in FIG. 1, taken along line 7-7 in FIG. 1.
Figure 20:
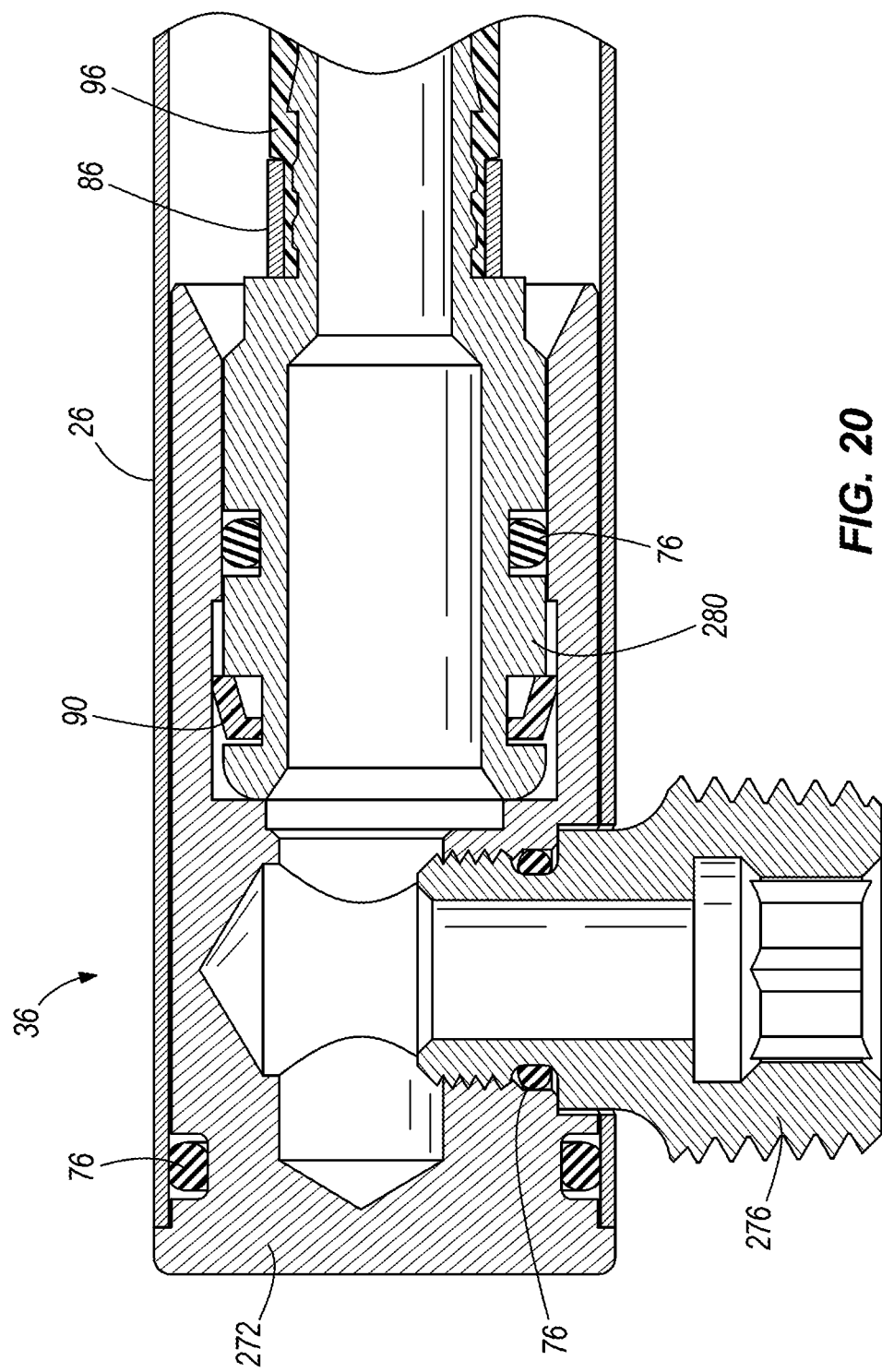
FIG. 20 is a partial sectional view of a showerhead connection assembly, taken along line 20-20 of FIG. 1.

The illustrated shower bar 26 is constructed as a one piece pipe which begins at the showerhead connection assembly 36 (see FIG. 20), is coupled to the upper supply bracket 56 (see FIG. 6), and ends at the transfer valve assembly 30 (see FIG. 7). As best seen in FIG. 6, the supply pipe 88, the first showerhead pipe 92, and the second showerhead pipe 96 are disposed in the interior of the shower bar 26 to provide a tube-in-tube assembly. The shower bar 26 has an opening 116 which corresponds to an opening 120 (see FIG. 5) in the annular portion 74 of the upper supply bracket 56. The shower bar 26 has an o-ring 124 or other sealing/coupling member on either side of the opening 116, corresponding to grooves 128 in the annular portion 74 of the upper supply bracket 56. Thus, when the shower bar 26 is inserted into annular portion 74 of the upper supply bracket 56, the o-rings 124 and grooves 128 cooperate to couple the shower bar 26 to the upper supply bracket 56. The o-rings 124 also act as a bearing to protect the finish of the shower bar 26 when the supply bracket 56 is assembled to the shower bar 26.

In other constructions (not shown), the upper supply bracket and shower bar 26 may be assembled in a different manner. For example, the annular portion 74 may be provided with a slot or opening to receive the shower bar 26 radially (rather than axially) into the annular portion 74. The annular portion 74 may be flexible and/or include a movable portion to open and allow the shower bar 26 to be inserted and then to close and retain the shower bar 26. The annular portion 74 may include a retaining arrangement (e.g., a clip, a snap, a fastener, etc.) (not shown) to hold the annular portion 74 in closed condition.

The supply pipe 88 and first showerhead pipe 92 are sized and configured such that the supply pipe 88 and first showerhead pipe or tube 92 do not touch each other or the shower bar 26 (see FIG. 6). Thus, a space 130 is provided between the inner surface of the shower bar 26 and the internal components (the supply pipe 88 and the first showerhead pipe or tube 92) which can inhibit thermal transfer between these components.

As shown in FIG. 2, the supply pipe 88 is coupled to the first cavity 80 of the inlet connector 64 by brazing, soldering, welding, a swage fit, an interference fit, etc., and the first showerhead pipe 92 is coupled to the second cavity 84 of the inlet connector 64 in a similar manner. In the illustrated embodiment, the second showerhead pipe 96 is made of a flexible material, such as cross-linked polyethylene (PEX). The second showerhead pipe 96 is flexible so that it can be inserted into a curved portion of the shower bar 26. The second showerhead pipe 96 is coupled to a connection piece 132 by a crimping ring 136 (see FIG. 6), and the connection piece 132 is coupled to the second cavity 84 of the inlet connector 64 by brazing, soldering, welding, a swage fit, an interference fit, etc.

The showerhead 22 is coupled to the upper supply assembly 28 through the shower bar 26, shown in FIG. 1, and the showerhead connection assembly 36. In the illustrated embodiment, the shower bar 26 is curved or arched. In alternative embodiments (not shown), the shower bar 26 may include a sharper curve or be otherwise bent (e.g., at a right angle), for example, to accommodate low ceilings, or can take any other desired shape.

Figure 8:
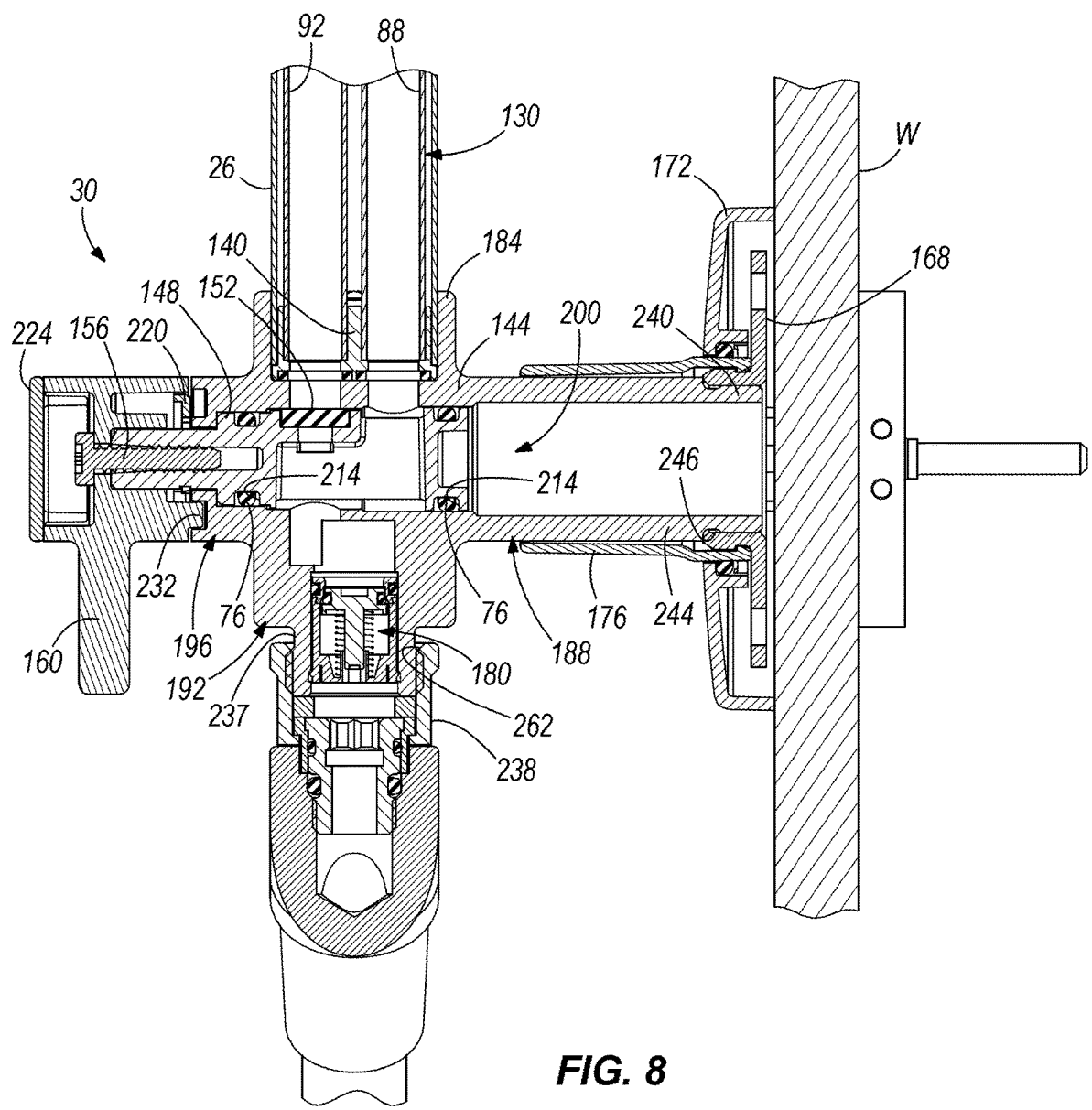
FIG. 8 is a sectional view of the transfer valve partially illustrated in FIG. 7, taken along line 8-8 in FIG. 1.

The transfer valve assembly 30, illustrated in section in FIG. 8, includes a diverter connector 140, a transfer valve body 144, a diverter stem 148, a contoured seal 152, a screw 156, a handle 160, a mounting collar 168, an escutcheon 172, a trim sleeve 176, and a check valve 180. The mounting collar 168, escutcheon 172, and trim sleeve 176 can be substantially identical to the mounting collar 44, escutcheon 48, and trim sleeve 52 described above in connection with the upper supply assembly 28, but this need not be the case.

Figure 9:
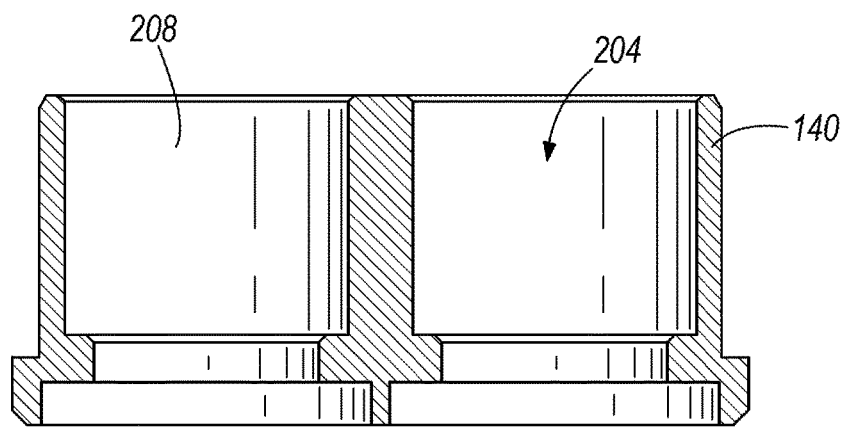
FIG. 9 is a sectional view of a diverter connector of the transfer valve shown in FIG. 8.

The illustrated transfer valve body 144 includes a first arm 184, a second arm 188, a third arm 192, and a fourth arm 196 and defines an internal cavity 200. The diverter connector 140, illustrated in section in FIG. 9, is coupled to the supply pipe 88 and to the first showerhead pipe 92. The diverter connector 140 is partially disposed in and coupled to the first arm 184 of the transfer valve body 144. The diverter connector 140 defines a first cavity 204, which receives a portion of the supply pipe 88 in the internal cavity 200, and a second cavity 208, which receives a portion of the first showerhead pipe 92. The supply pipe 88 and first showerhead pipe 92 may be welded, brazed, etc. to the diverter connector 140. The diverter connector 140 is shown coupled to the transfer valve body 144 using screws (see FIG. 19). In an alternative embodiment (not shown), the diverter connector 140 may be welded, brazed, etc. to the transfer valve body 144.

Figure 10:
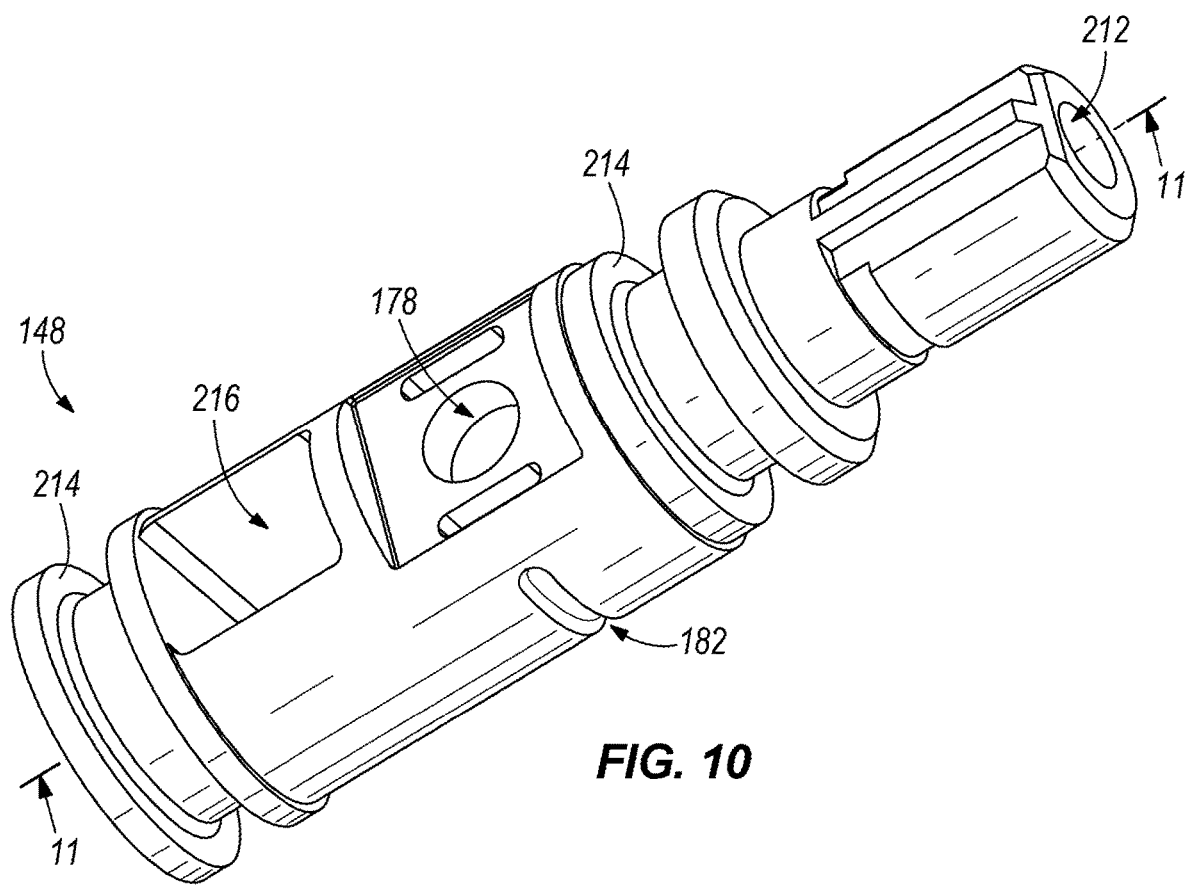
FIG. 10 is a perspective view of a diverter valve of the transfer valve shown in FIG. 8.
Figure 11:
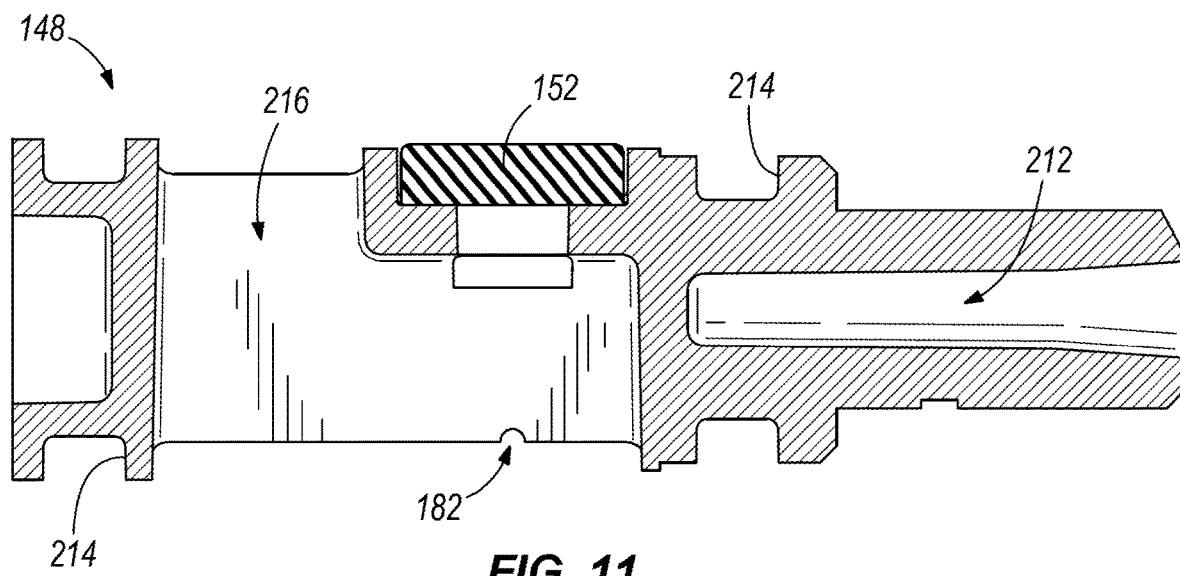
FIG. 11 is a sectional view of the diverter valve illustrated in FIG. 10, taken along line 11-11 in FIG. 10.

The illustrated diverter stem 148, shown in FIG. 10 and in section in FIG. 11, defines a first cavity 212 for receiving the screw 156, a portion of the first cavity 212 being threaded. The diverter stem 148 is partially disposed within the transfer valve body 144. Two grooves 214 are shown formed on the diverter stem 148. Seals 76 are positioned in the grooves 214 to seal the diverter stem 148 and the transfer valve body 144. The diverter stem 148 defines a second cavity 216 through which water passes.

Figure 12:
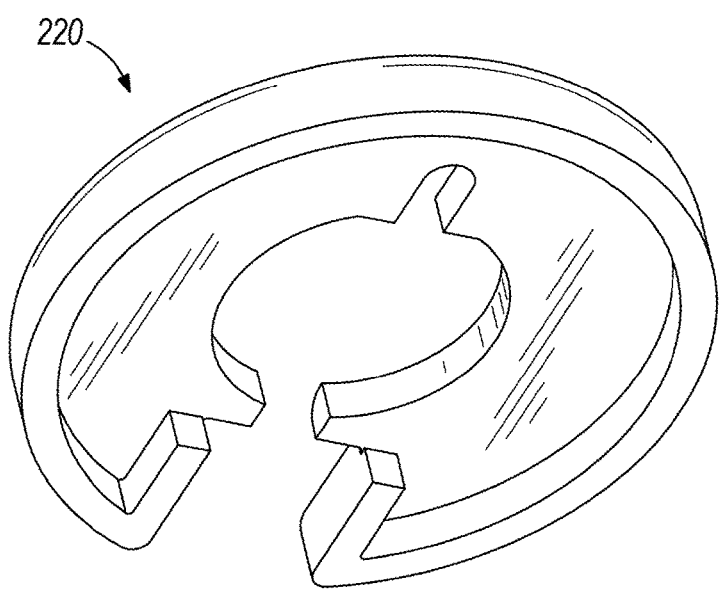
FIG. 12 is a perspective view of a clip of the transfer valve shown in FIG. 8.

A clip 220, illustrated in FIG. 12, is keyed, pressed onto and fits in a grooved portion of the diverter stem 148 to inhibit rearward movement of the diverter stem 148 in the transfer valve body 144. The clip 220 turns when the diverter stem 148 is turned. In the illustrated embodiment, the clip 220 acts as a bearing against the front surface of the transfer valve body 144. The clip 220 includes an opening to allow the clip 220 to be attached to the grooved portion of the diverter stem 148. The clip 220 helps maintain a proper clearance gap between the handle 160 and the transfer valve body 144. A portion of the clip 220 includes a flat surface or rib to assist in removal of the clip 220 from the diverter stem 148 during product service. The clip 220 can be removed by spreading the flat surfaces with a tool, such as pliers. In the illustrated embodiment, the clip 220 is made of plastic, but, in other embodiments, the clip 220 may be formed of another material, such as metal.

Figure 13:
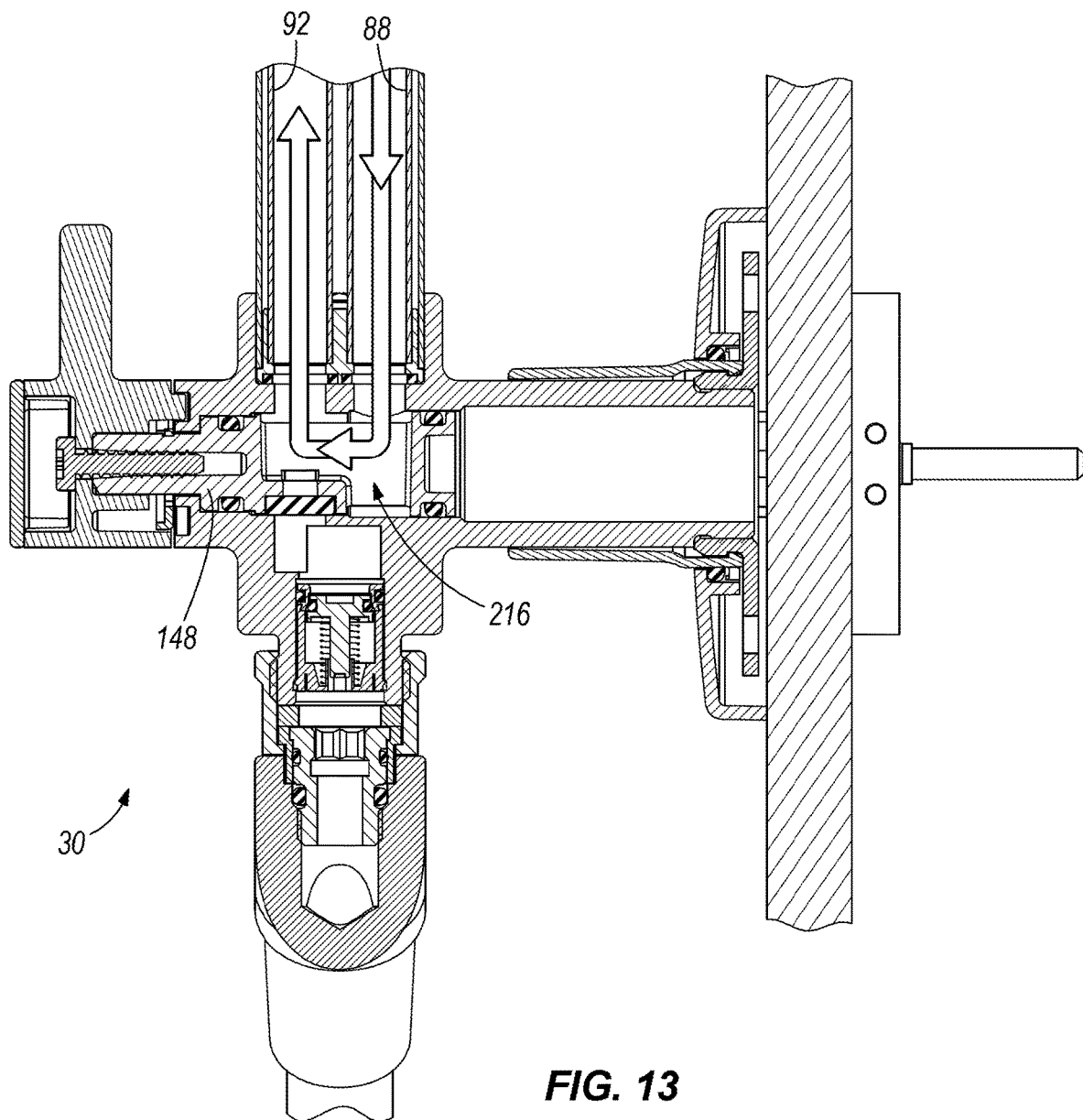
FIG. 13 illustrates the diverter stem, of the transfer valve shown in FIG. 8, in a first position.
Figure 14:
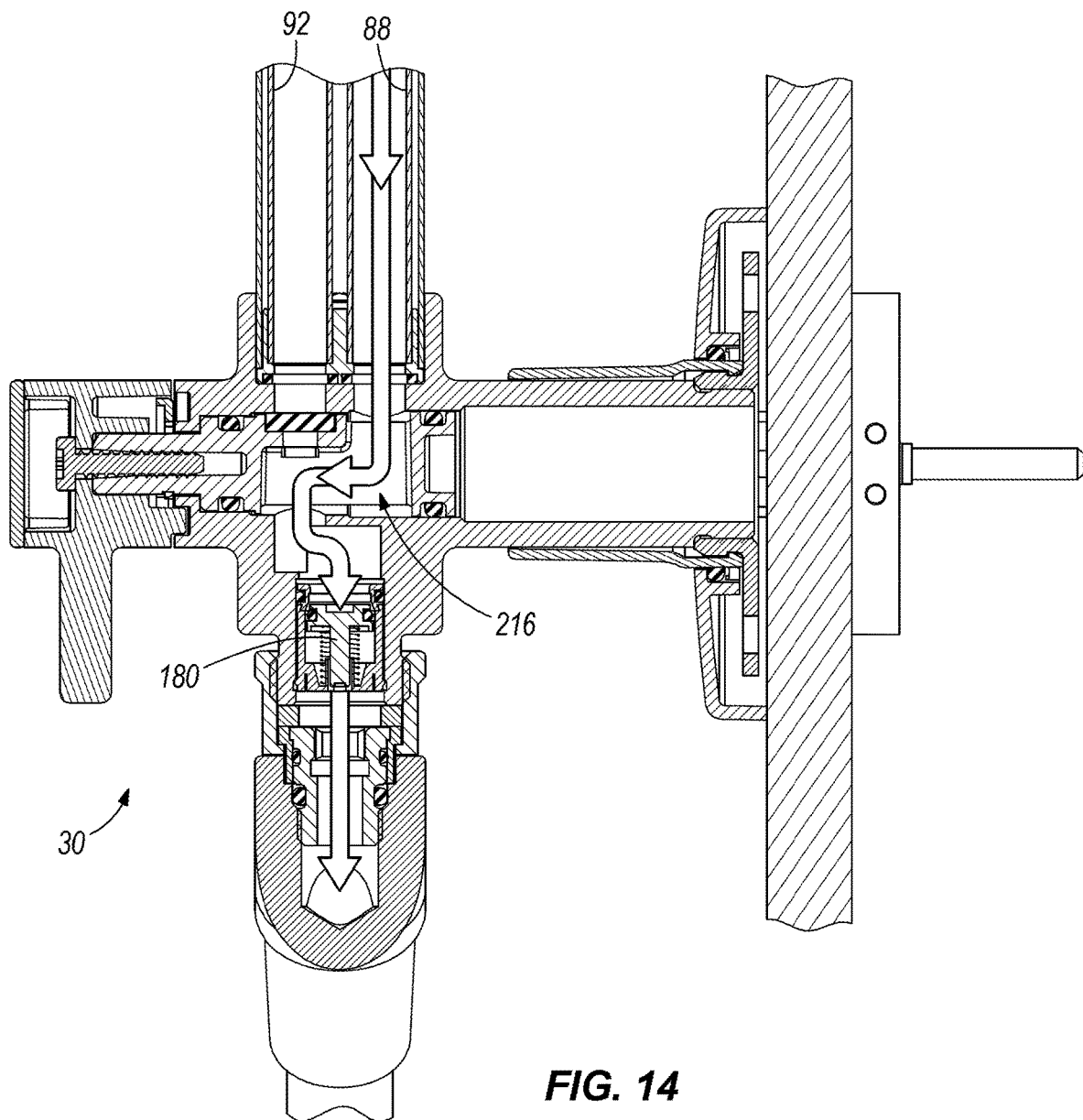
FIG. 14 illustrates the diverter stem, of the transfer valve shown in FIG. 8, in a second position.

The diverter stem 148 is rotatable at least about 180 degrees within the transfer valve body 144. In a first position, the second cavity 216 is in communication with and receives water from the supply pipe 88 and operates to supply water to the first showerhead pipe 92. FIG. 13 illustrates the diverter stem 148 in the first position, showing the water flow to the first showerhead pipe 92. In a second position (e.g., 180 degrees from the first position), the second cavity 216 is in communication with and receives water from the supply pipe 88 and operates to supply water to the check valve 180. FIG. 14 illustrates the diverter stem 148 in the second position, showing the water flow to the check valve 180.

Figure 15:
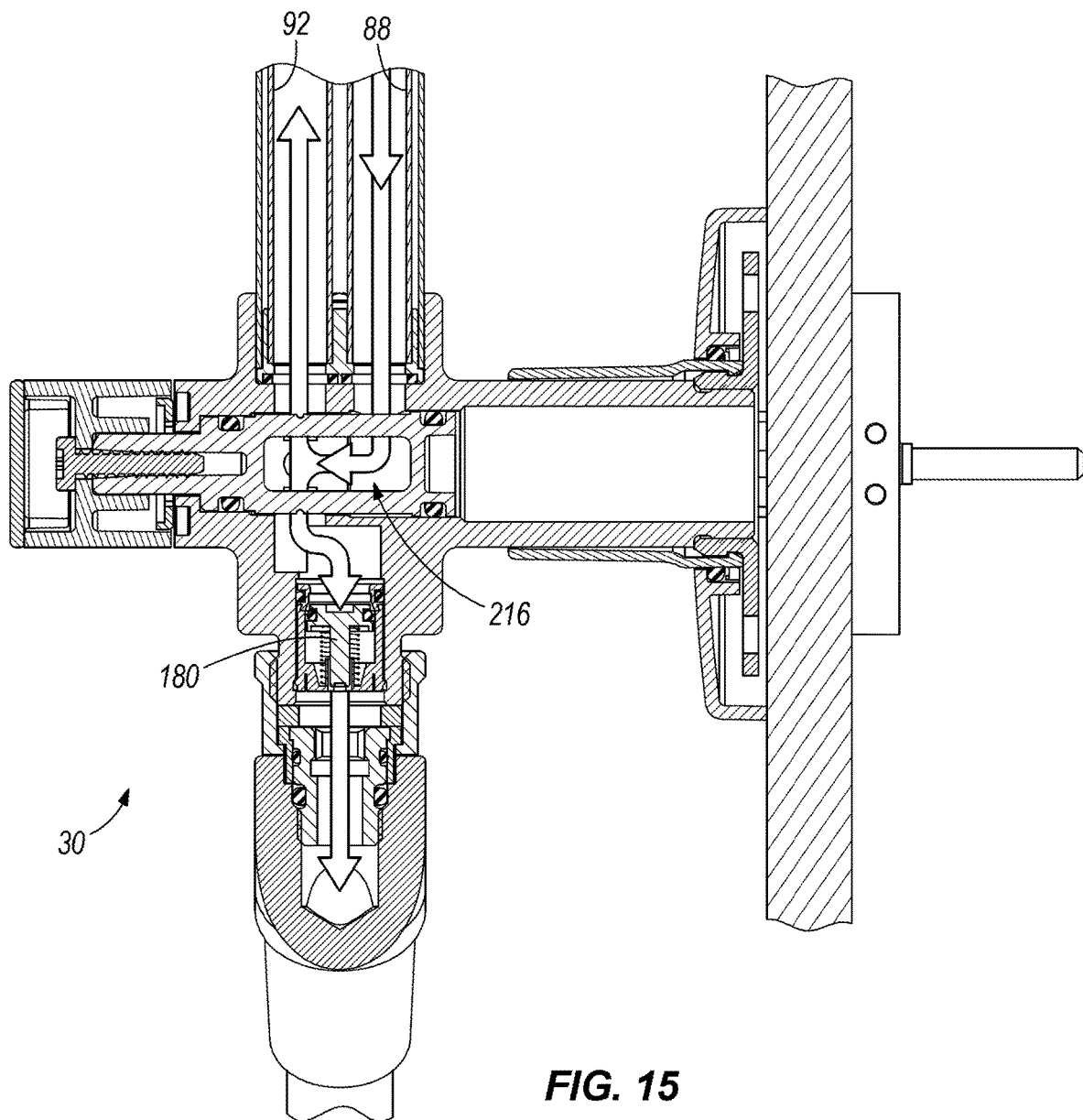
FIG. 15 illustrates an alternative embodiment of a transfer valve, showing the diverter stem in a third position.

An alternative embodiment includes a third position, and, in the third position, the second cavity 216 is in communication with and receives water from the supply pipe 88 and operates to supply water to both the first showerhead pipe 92 and the check valve 180. FIG. 15 illustrates the diverter stem 148 in the third position, showing the water flow to the first showerhead pipe 92 and to the check valve 180.

Figure 16:
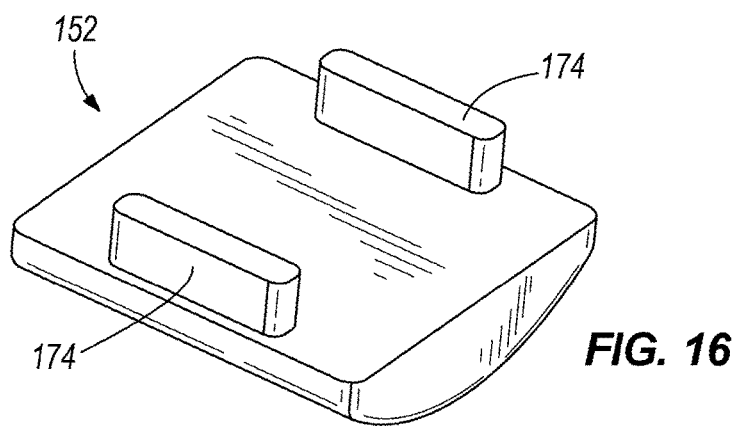
FIG. 16 is a perspective view of a flat seal of the transfer valve shown in FIG. 8.

The contoured seal 152, illustrated in FIG. 16, is placed over an opening of the second cavity 216. The contoured seal 152 includes two protrusions 174 which are sized and configured to be inserted into corresponding slots on the diverter stem 148 in a seal pocket. The protrusions 174 assist in maintaining the position of the contoured seal 152 relative to the diverter stem 148 when the diverter stem 148 is rotated. The protrusions also prevent the contoured seal 152 from extruding or peeling into the outlets in the transfer valve body 144 when the contoured seal 152 moves across the outlets.

The diverter stem 148 includes an opening 178 to allow water pressure to press against the contoured seal 152 when water pressure is present in the second cavity 216. The water pressure against the contoured seal 152 assists in pressing and sealing the contoured seal 152 to the first showerhead pipe 92 or to the check valve 180, depending on the position of the diverter stem 148. When the diverter stem 148 is in the first position, the contoured seal 152 operates to shut off water flow to the check valve 180. When the diverter stem 148 is in the second position, the contoured seal 152 operates to shut off water flow to the first showerhead pipe 92.

The diverter stem 148 includes a groove 182 to allow a limited amount of water flow to the first showerhead pipe 92 and to the check valve 180 when the diverter stem 148 is between the first position and the second position so that the valve is not completely shut off in these positions. This may ensure that there is not cross flow between the hot and cold water supply lines and water pressure does not build up in a hot and cold water mixing valve (part of the household or commercial water supply system, not shown) which can effect operation of and/or damage the mixing valve. In some alternative embodiments, the contoured seal 152 may be sized and configured to allow water to escape only to the check valve 180 or only to the first showerhead pipe 92. Limiting the water flow when the diverter stem 148 is between the first and second positions encourages the user to position the diverter stem 148 in the first or second position.

The handle 160, best seen in section in FIG. 8, is coupled to the diverter stem 148 by the screw 156 or by a bolt, other fastener or fastening method. In the illustrated embodiment, the screw 156 passes through a recess in the fourth arm 196.

A decorative end cap 224 may be placed over a portion of the handle 160 to conceal the head of the screw 156.

Figure 17:
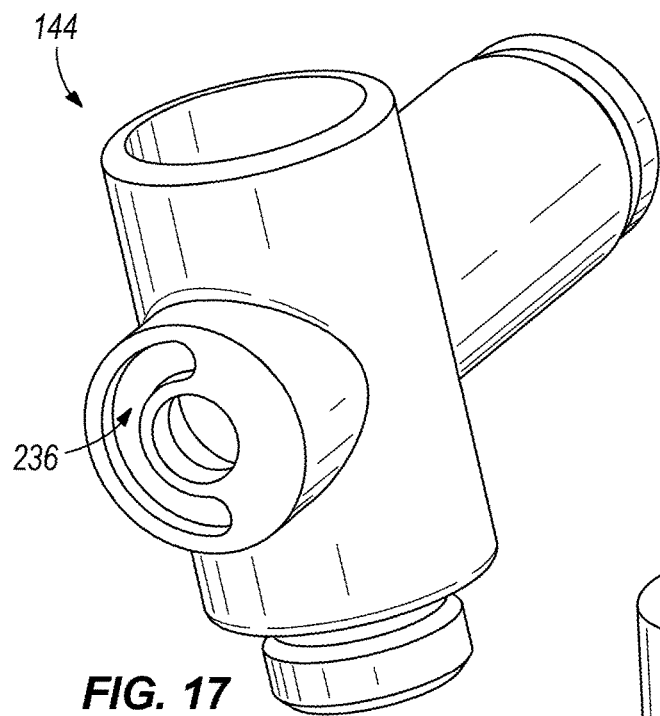
FIG. 17 is a perspective view of a transfer valve body of the system shown in FIG. 1.

The handle 160 and diverter stem 148 are configured such that, when the handle 160 rotates, the diverter stem 148 also rotates. The handle 160 includes a protrusion 232 which mates with a recess 236 (best seen in FIG. 17) on the transfer valve body 144. The protrusion 232 and the recess 236 cooperate to limit the range of rotation of the handle 160 and the diverter stem 148 to, for example, 180 degrees, and to define the first and second positions of the diverter stem 148. In other embodiments (not shown), the handle 160 and the diverter stem 148 may be rotatable to a greater or lesser degree.

Figure 18:
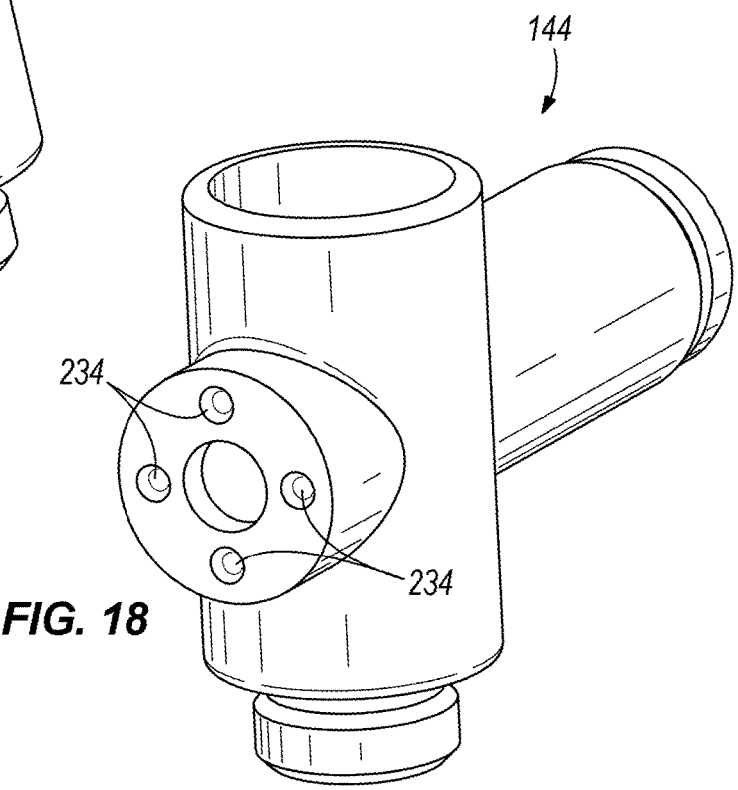
FIG. 18 is a perspective view of an alternative embodiment of a transfer valve body.

In an alternative embodiment, the handle 160 defines a cavity to receive a separate pin. A spring surrounds a portion of the pin and serves to bias the pin towards the transfer valve body 144. A recess 234, as illustrated in FIG. 18, at the each end of the range of rotation is defined on the transfer valve body 144. The spring-biased pin and recesses 234 cooperate to limit the range of rotation of the handle 160 and the diverter stem 148. One or more intermediate recesses 234 may be provided to, in cooperation with the pin, define the intermediate position(s) of the handle 160 and the diverter stem 148. The opening in the clip 220 provides clearance for the protrusion 232 or the spring-biased pin on the handle 160.

In the illustrated embodiment, the check valve 180 is disposed substantially in the third arm 192. The check valve 180 serves to prevent reversed/backflow of contaminated water into the shower bar system 20 and to the water supply. Backflow may be caused by a back siphon due to failure in the water supply system (e.g. water main or pipe breaks). Check valves or vacuum breakers are used in systems with a moveable water outlet, such as the handshower 24, that could be placed into a vessel or bath fixture containing contaminated water. The illustrated embodiment uses a commercially-available check valve 180, such as NEOPERL Model Number 31.4264.0, from NEOPERL, Inc., located in Waterbury, Conn. Referring to FIG. 8, a groove 237 is defined on the third arm 192 so that a coupling nut 238 may be coupled to the third arm 192. In an alternative embodiment, threads may be provided on the third arm 192 so that the coupling nut 238 may be threadedly coupled to the third arm 192.

The second arm 188 includes a first cylindrical section 240 and a second cylindrical section 244, and, in the illustrated embodiment, the diameter of the second cylindrical section 244 is greater than the diameter of the first cylindrical section 240. A grooved or recessed portion 246 is disposed between the first cylindrical section 240 and the second cylindrical section 244. External threads are disposed on the first cylindrical section 240.

The illustrated transfer valve assembly 30 relies upon movement of the diverter stem 148 to different rotational positions to port fluid to and from the transfer valve assembly 30. Although the particular valve shape and configuration described and illustrated herein provides various advantages in performance, it should be understood that other types of valves can be used that perform the same and other functions. By way of example only, the illustrated transfer valve assembly 30 can instead take the form of a multi-port ball, plug, or spool valve with ports appropriately selected and positioned with respect to one another with a diverter stem 148 moved by the handle 160 to adjust fluid flow as generally described herein. Such alternative types of transfer valves fall within the spirit and scope of the present invention.

It should be understood that, in other embodiments (not shown), the shower bar system 20 may not include a transfer valve assembly. In such embodiments, the shower bar system 20 would include only one water dispensing device (e.g., a showerhead 22 or a handshower 24) such that transfer of water flow is not required.

Figure 19:
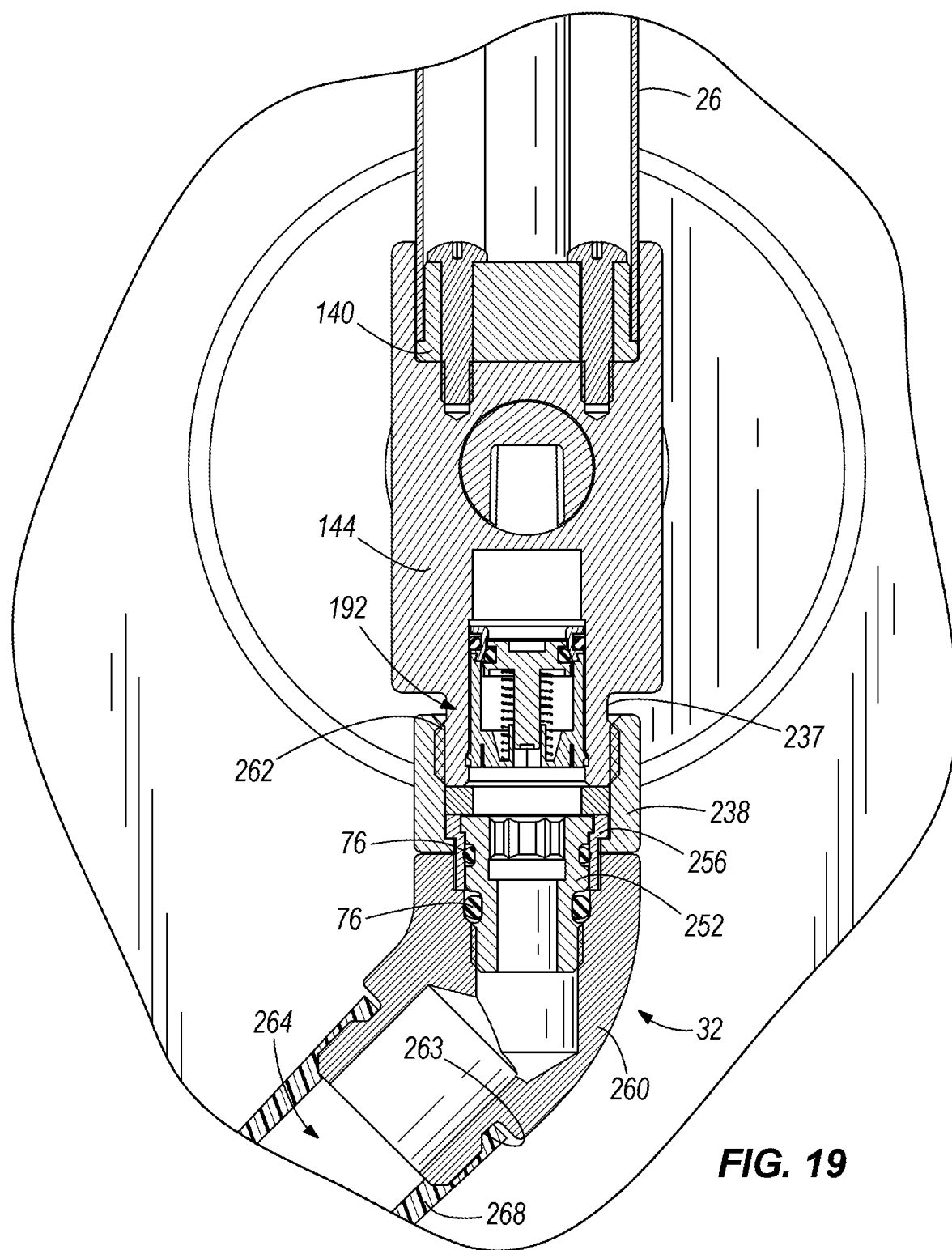
FIG. 19 is a sectional view of an angled hose connector of the system shown in FIG. 1, taken along line 19-19 in FIG. 1.

The angled hose connector 32, illustrated in section in FIG. 19, includes the coupling nut 238, a threaded pin 252, a bushing 256 and an elbow 260, all of which cooperate to define a passageway. The coupling nut 238 includes a tabbed portion 262 operable to couple the coupling nut 238 to the third arm 192 of the transfer valve body 144.

External threads are disposed on the threaded pin 252, and a hollow portion of the threaded pin 252 has a shaped (e.g. hexagonal) cutout to allow a tool with a complementary-shaped head to turn the threaded pin 252. The elbow 260 has internal threads to couple to the threaded pin 252. An end of the elbow 260 includes a groove 263. The illustrated elbow 260 is bent (from the inlet to the outlet) at an angle of, for example, 135 degrees, although greater and lesser angles are contemplated. In some embodiments, the angle can be between 95 degrees and 175 degrees. In other embodiments, the angle can be between 105 degrees and 165 degrees. In still other embodiments, the angle can be between 115 degrees and 155 degrees. The elbow 260 can rotate 360 degrees in either direction around the center axis of the bushing 256.

A hose 264 couples the angled hose connector 32 to the handshower 24. The illustrated hose 264 is constructed with plastic tubing to limit or prevent damage due to contact of the hose 264 with components of the shower bar system 20, the on/off valve V, etc. In addition, the elbow 260 assists in guiding the hose 264 away from the shower on/off valve V. The hose 264 is commercially available from a number of suppliers. The hose 264 includes a hose bushing 268 which is inserted onto a groove of the elbow 260 to couple the bushing 268 to the elbow 260. In an alternative embodiment (not shown), the hose bushing 268 may be threadedly coupled to the elbow 260. The hose 264 and the hose bushing 268 are sealed together (e.g., by a washer (not shown) pressed against the hose bushing by the elbow). The hose 264 is free to rotate within the hose bushing 268. In the illustrated embodiment, the hose bushing 268 is made of plastic, but, in an alternative embodiment, the hose bushing 268 may be formed of another material, such as metal.

In an alternative embodiment (not shown), the hose connector 32 may not be used. Instead, the hose 264 would be directly coupled to the transfer valve body 144. In yet another alternative embodiment (not shown), the check valve 180 may be positioned in the hose 264 instead of in the transfer valve body 144.

The handshower 24 is coupled to the hose 264 in a manner similar to the coupling between the elbow 260 to the hose 264. In the illustrated embodiment, the handshower 24 is similar to the handshower shown and described in U.S. Pat. No. 7,578,453, the entire contents of which are hereby incorporated by reference. It should be understood that, in other embodiments (not shown), a different handshower (not shown) may be used, or the shower bar system 20 may not include a handshower.

Referring back to FIG. 1, the handshower 24, when not being held by the user, may be held on the shower bar 26 by the bracket assembly 34. The illustrated bracket assembly 34 is slidably supported on the shower bar 26 to adjust the position (e.g., the height) of the handshower 24. The construction of the shower bar 26 (encasing the supply pipe 88 and the first showerhead pipe 92) allows the bracket assembly 34 to easily slide up and down along and/or to pivot about the shower bar 26. The bracket assembly 34 may also allow the angle of the handshower 24 (about a horizontal axis and/or about a vertical axis) to be adjusted as desired by the user.

In the illustrated embodiment, the bracket assembly 34 is similar to the bracket assembly shown and described in U.S. Pat. No. 7,766,291, the entire contents of which are hereby incorporated by reference. It should be understood that, in other embodiments (not shown), a different bracket assembly (not shown) may be used with the handshower 24, if provided.

The showerhead connection assembly 36 (see FIG. 20) includes an end cap 272 and a showerhead adapter 276 to fluidly couple the second showerhead pipe 96 to the showerhead 22. The end cap 272 is sized such that a portion of the end cap 272 fits into the shower bar 26. The end cap 272 includes a cavity which allows water to pass through. A first end of the end cap 272 is flared to allow an installer to easily insert therein a tapered insert 280, which is coupled to the second showerhead pipe 96. The second showerhead pipe 96 is coupled to a fitting on an end of the tapered insert 280 by a stainless steel clamp ring 86. The tapered insert 280 inhibits, by way of a plastic split lock ring 90, the end of the second showerhead pipe 96 from being withdrawn or decoupled from the end cap 272. The split lock ring 90 is disposed in a groove in the outer surface of the tapered insert 280 and fits into a machined undercut in an inner surface of the end cap 272. To seal the connection between the end cap 272 and the second showerhead pipe 96, a seal 76 is disposed in the cavity of the end cap 272. Another seal member 76 is disposed on the exterior of the end cap 272 to secure the end cap 272 in the shower bar 26.

One end of the showerhead adapter 276 is threadedly (or otherwise) coupled to the end cap 272. The showerhead adapter 276 includes a flat portion which engages with the end cap 272. The flat portion also assists in keeping the location of the showerhead adapter 276 consistent with respect to the end cap 272. A seal 76 is disposed on the showerhead adapter 276 to seal the connection between the end cap 272 and the showerhead adapter 276. A portion of the hollow cavity of the showerhead adapter 276 has a shape (e.g. hexagonal) to provide for the showerhead adapter 276 to be rotated or turned about an axis by a tool with a complementary-shaped head. The other end of the showerhead adapter 276 is threaded to couple the showerhead 22 to the showerhead adapter 276.

Figure 21:
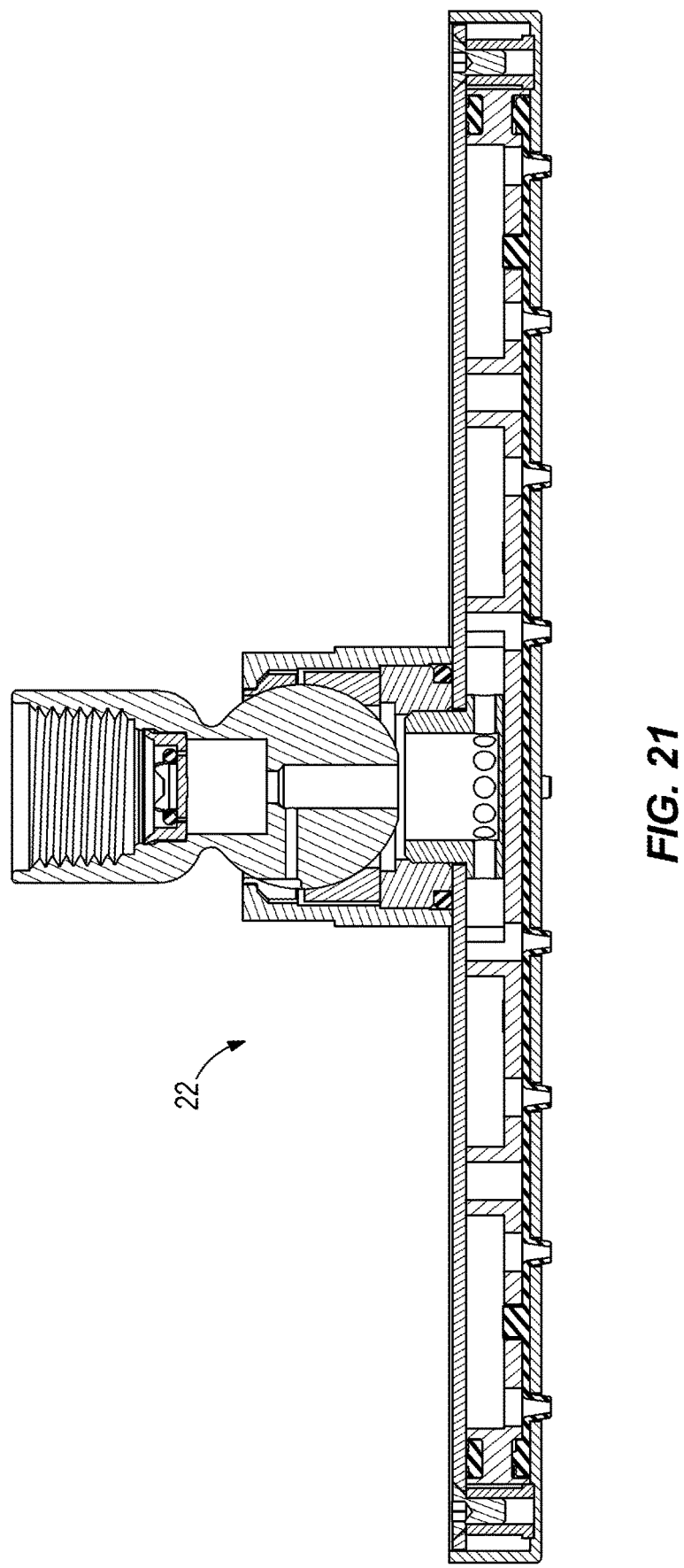
FIG. 21 is a partial sectional view of a showerhead shown in FIG. 1, taken along line 21-21 in FIG. 1.

The showerhead 22, shown in section in FIG. 21, is threadedly coupled to the showerhead adapter 276. The illustrated showerhead 22 is Kohler Model K-13695, available commercially from Kohler, Co. of Kohler, Wis. It should be understood that, in other embodiments (not shown), a different showerhead (not shown) may be used, or the shower system may not include a showerhead (or showerhead connection assembly).

As mentioned above, the shower bar system 20 may be installed in new construction of a shower or bathing installation or retrofitted into an existing installation. Assembly of the shower bar system 20 may be as follows: the shower bar 26 is inserted into open annular portion 74 of the upper supply bracket 56, and the o-rings 124 engage the respective grooves 128. The supply connector 60 is then inserted and threaded into the upper supply bracket 56 so that the supply connector 60 is pressed into the first cavity 80 of the inlet connector 64 through openings 116, 120. The trim sleeve 52 and escutcheon 48 are then disposed on the second cylindrical section 104 of the upper supply bracket 56.

To assemble the transfer valve assembly 30, the diverter stem 148 is inserted into the second arm 188 of the transfer valve body 144. The forward end of the diverter stem 148 projects from the fourth arm 196, and the clip 220 is coupled to the diverter stem 148 to prevent it from moving rearwardly in the transfer valve body 144. The handle 160 is coupled in the proper orientation (with the protrusion 232 substantially received in the recess 236) to the diverter stem 148. The end cap 224 is coupled to the end of the handle 160. The trim sleeve 176 and escutcheon 172 are disposed on the second arm 188 of the transfer valve body 144, and the mounting collar 168 is threaded onto the second arm 188.

The diverter connector 140, with the attached supply pipe 88 and first showerhead pipe 92, is coupled to the first arm 184 of the transfer valve body 144. The lower end of the shower bar 26 is received in the annular space between the diverter connector 140 and the first arm 184 and coupled to the transfer valve body 144 (e.g., by welding, brazing, etc.).

The check valve 180 is inserted into the third arm 192 and is held in place by a friction fit. To couple the angled connector 32 to the transfer valve assembly 30, the coupling nut 238 is then positioned onto the third arm 192 of the transfer valve body 144 with the tabbed portion of the coupling nut 238 received in the groove on the third arm 144. The angled hose connector 32 also helps contain the check valve 180 in the third arm 192. The hose 268 is coupled to the angled connector 32, and the handshower 24 is coupled to the hose 268. In an alternative embodiment, the third arm 192 includes a groove disposed in the interior thereof for receiving a flange or rib disposed on the check valve 180 to help maintain the check valve 180 in position when water is flowing.

To fix the upper supply bracket 56 to the shower wall W (see FIG. 2), a first hole, having a diameter approximately equal to the diameter of the first cylindrical section 100 of the upper supply bracket 56, is made in the wall W. A second hole and a third hole are made in the wall W, and the mounting collar 44 is coupled to the wall W using fasteners (e.g., toggle bolts and screws, etc.), disposed through the second and third holes. In an alternative embodiment, the mounting collar 44 is not coupled to the wall W until after the upper supply bracket 56 is coupled to the mounting collar 44. In an alternative embodiment, toggle screws or washers are placed between the mounting collar 44 and the shower wall W to distribute some or all of any pulling forces that may occur. The supply adapter 40 is threadedly coupled to the water supply pipe P.

The outlet end of the supply adapter 40 is received in the upper supply bracket 56 as the first cylindrical section 100 of the upper supply bracket 56 is inserted into the circular opening 112 of the mounting collar 44. The upper supply bracket 56 is moved (e.g., slid) along the supply adapter to the appropriate position based upon the distance between the outlet of the water supply pipe P (behind the wall W) and desired position of the shower bar 26 (in front of the wall W). The upper supply bracket 56 and supply adapter 40 are extended (e.g., telescoped outwardly) to accommodate a larger distance (e.g., because the outlet of the water supply pipe P is farther from the wall W) or are retracted (e.g., telescoped inwardly) to accommodate a shorter distance (e.g., because the outlet of the water supply pipe P is closer to the wall W).

The upper supply bracket 56 and the mounting collar 44 are threadedly coupled together. The mounting collar 44 and upper supply bracket 56 bear any force applied to the shower bar system 20, rather than such force being applied to the water supply pipe P. In an alternative embodiment, a tabbed portion of the mounting collar 44 snaps into the groove 108 of the upper supply bracket 56 to secure the supply bracket 56 to the mounting collar 44.

The trim sleeve 52 is then moved (e.g., slid) towards the wall until a tabbed portion of the trim sleeve 52 snaps into a grooved portion 278 of the mounting collar 44. The escutcheon 48 is moved (e.g., slid) towards the wall W until the outer portion of the escutcheon 48 contacts the wall W. The escutcheon 48 is generally held in place by friction and may include a frictional member 76 to assist in holding the escutcheon 48 on the trim sleeve 52.

The mounting collar 168 on the transfer valve body 144 may be coupled to the wall W in a similar manner. Two holes are made in the wall W, and the mounting collar 168 is coupled to the wall W using toggle bolts and screws, etc., placed through the holes. The trim sleeve 176 and the escutcheon 172 are positionable to provide for coupling of the mounting collar 168 to the wall W and, thereafter, to cover and conceal the connection.

The size of the waterway from the supply adapter 40 to the transfer valve 30 and from the transfer valve 30 to the showerhead adapter 276 is designed to allow sufficient water flow to maintain spray performance on larger showerheads 22 and handshowers 24, even at low supply pressures. In the illustrated embodiments, the waterway has, for example, a minimum 0.300 inch diameter or 0.071 square inch cross-sectional opening.

In the United States, the outlet of the water supply pipe P for the shower is usually positioned about 6 to 7 feet above the floor of the installation, and the shower bar system 20 is installed in the first configuration, described above. However, in other countries (e.g., in Europe or in Asia), the outlet of the water supply pipe P may be at a lower height, for example, at about waist level (e.g., 3 to 4 feet above the floor of the installation). In an alternative, second configuration, illustrated in FIGS. 22-23, the shower bar system 20 may be modified to accommodate an installation in which the water supply pipe is at a lower height.

Figure 24:
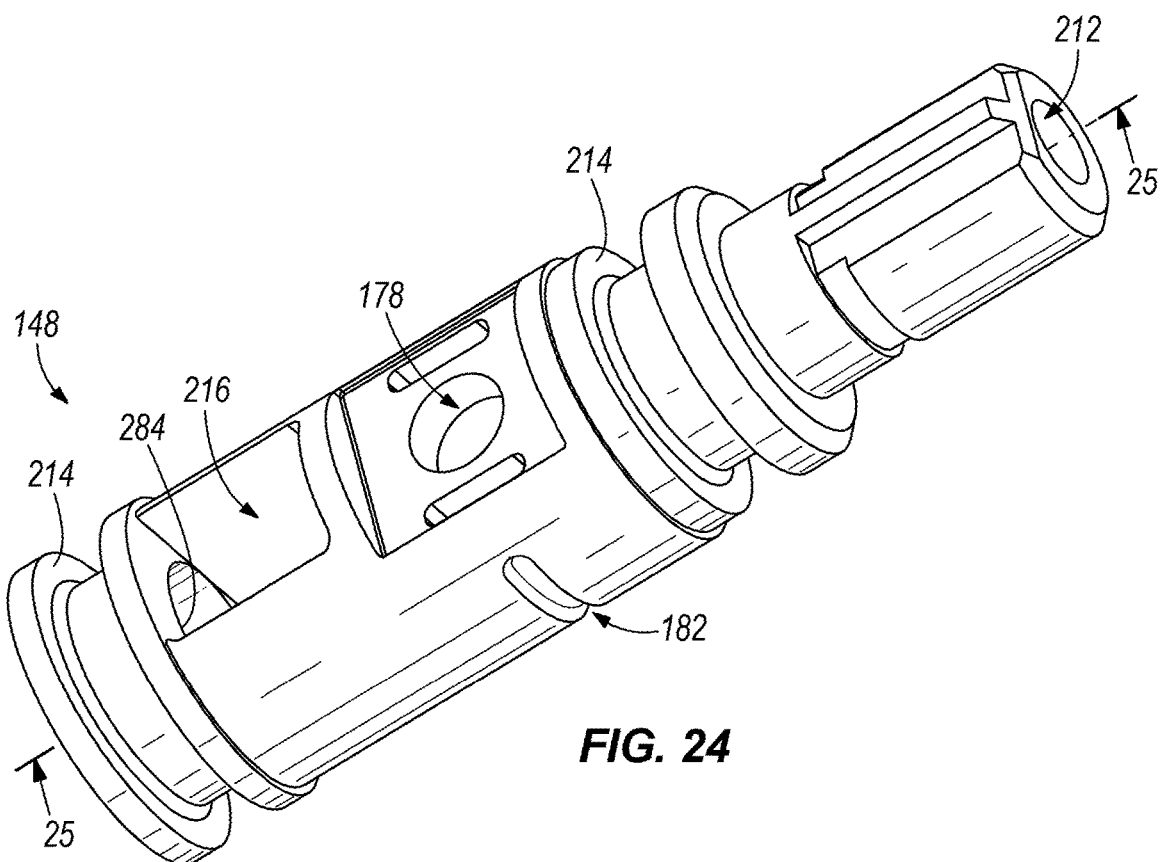
FIG. 24 is a perspective view of an alternative configuration of a diverter valve of the transfer valve shown in FIG. 8.
Figure 25:
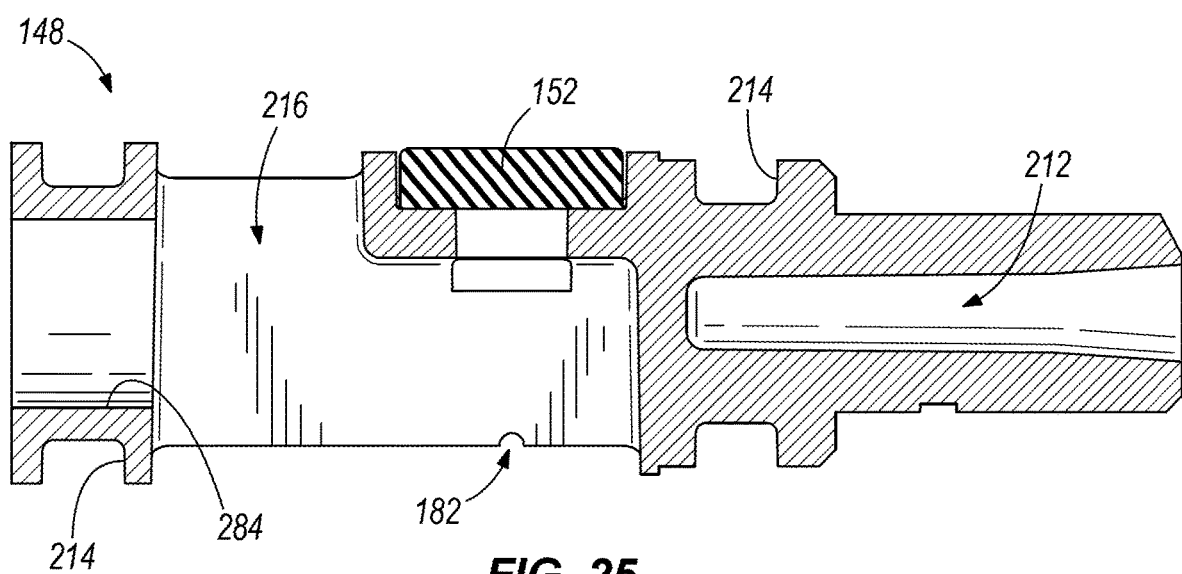
FIG. 25 is a sectional view of the diverter valve shown in FIG. 24, taken along line 25-25 in FIG. 24.

For example, in the second configuration, the diverter stem 148 is modified to define (see FIG. 22) a hole 284 on the end of the diverter stem 148 (closest to the wall W) (see also FIGS. 24-25). The transfer valve assembly 30 is coupled to the lower water supply pipe P in a manner similar to the connection of the upper supply bracket 56, in the first configuration described above. The supply adapter 40 is attached to the lower water supply pipe P and inserted into the second arm 188 of the transfer valve body 144 (rather than into the upper supply bracket 56). Thus, water enters the transfer valve body 144 and is passed directly to the diverter stem 148.

Figure 22:
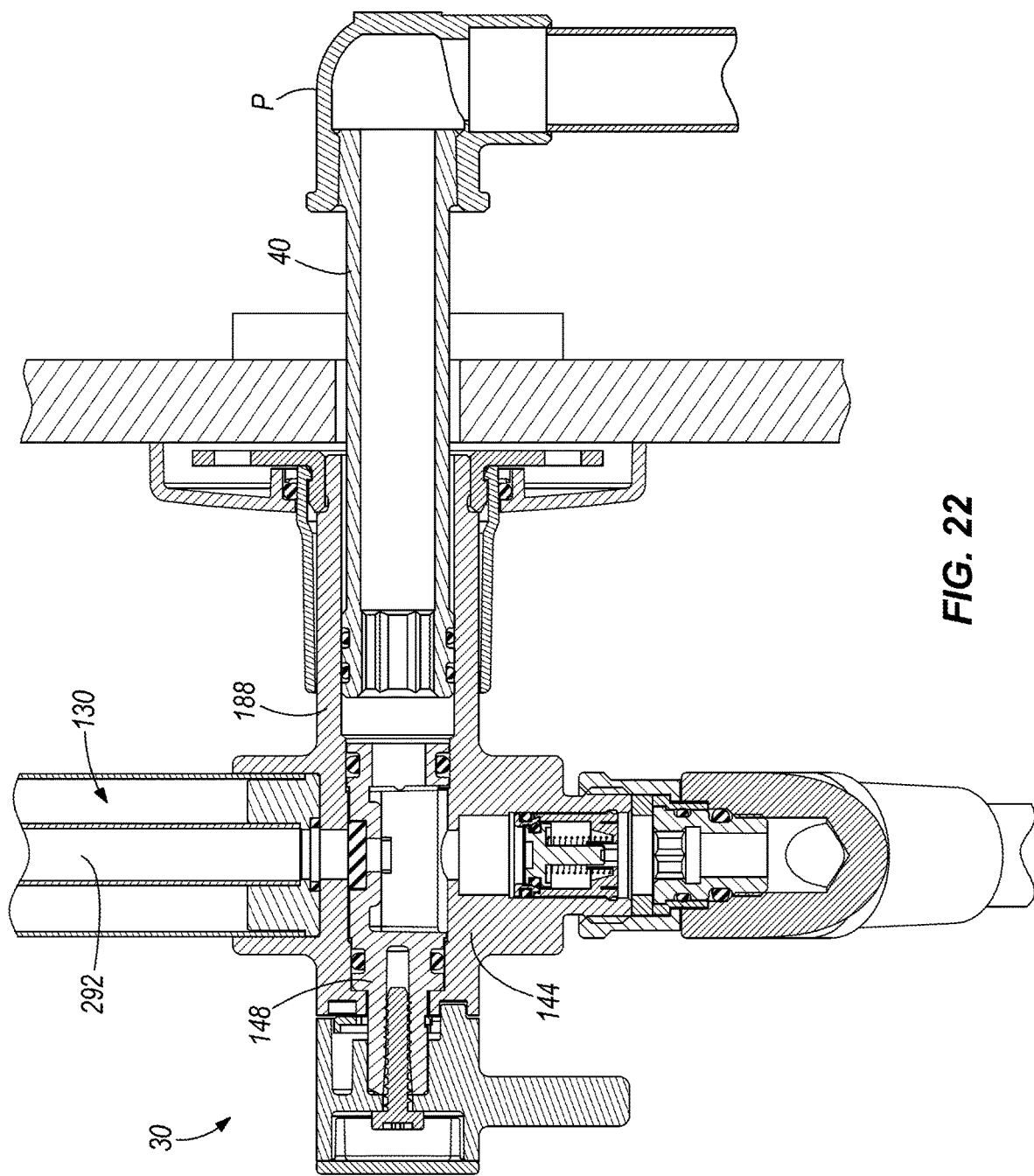
FIG. 22 is a sectional view of an alternative configuration of a transfer valve modified to accommodate an installation in which a water supply pipe is at a lower height.
Figure 23:
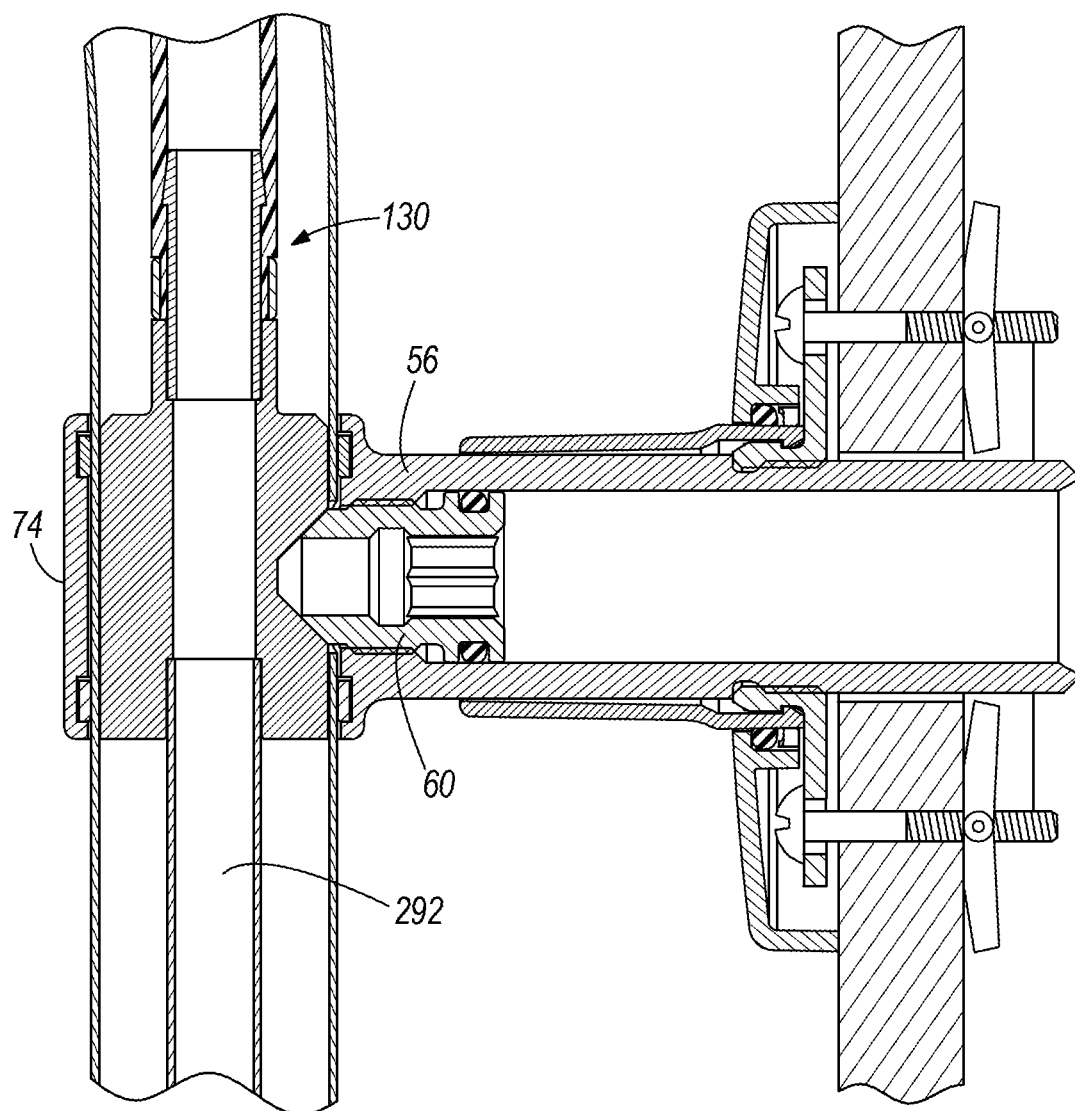
FIG. 23 is a sectional view of an alternative configuration of an upper supply assembly modified to accommodate an installation in which the water supply pipe is at a lower height.

In the second configuration illustrated in FIGS. 22-23, the diverter stem 148 is modified to accommodate just a single pipe, instead of the first showerhead pipe 92 and the supply pipe 88. The supply pipe 88 and first showerhead pipe 92 are removed from the waterway assembly. The inlet connector 64 is modified to accommodate a single pipe 292. The single pipe 292 fluidly couples the diverter stem 148 to the inlet connector 64. In an alternative construction (not shown), the first and second showerhead pipes 92, 96 are coupled together to form a single pipe.

In another embodiment, shown in FIGS. 24-25, the diverter stem 148 is modified to accommodate the first configuration (including the second cavity 216 coupled to the supply pipe 88 and the opening 178 coupled to the first showerhead pipe 92) and the second configuration (defining a second inlet 284 in the rear end (toward the wall W)). With this modified diverter stem 148, the shower bar system 20 can selectively be used with a high or low supply pipe P with minimal modification required by the installer (e.g., a single shower bar system 20 can be manufactured for use with either high or low supply pipes P).

In such a construction, when the shower bar system 20 is installed on a high supply pipe P, the installer closes the lower fluid connection of the shower bar system 20 (e.g., plugs the second arm 188 of the transfer valve body 144, or the second outlet 284) to inhibit water from leaking out of the escutcheon 172. When the shower bar system 20 is installed on a low supply pipe P, the installer closes the upper fluid connection of the shower bar system 20 (e.g., plugs the upper supply bracket 56 (the first cylindrical section 100, the second cylindrical section 104, etc.) to ensure that water does not exit the upper supply bracket 56 toward the wall W.

Instead of plugging the un-used fluid connection of the shower bar system 20, the shower bar system 20 may include a valve arrangement to prevent unwanted flow. For example, a check valve (not shown) may be provided for each fluid connection to allow incoming flow from the selected fluid connection (e.g., the high supply pipe P) and to prevent outgoing flow through the un-used fluid connection (e.g., the low supply pipe P). One check valve (not shown) could be disposed at a location between the second cavity 216 and the upper supply bracket 56 to inhibit water from exiting the upper supply bracket 56 when the shower bar system 20 is installed on a low supply pipe P and to allow water into the upper supply bracket 56 when the shower bar system 20 is installed on a high supply pipe P. Another check valve (not shown) may be disposed in or near the second inlet 284 or second arm 188 to inhibit water from exiting through the escutcheon 172 when the shower bar system 20 is installed on a high supply pipe P and to allow water into the second inlet 284 when the shower bar system 20 is installed on a low supply pipe P.

The shower bar system 20 described herein may provide several independent features and/or independent advantages. The shower bar system 20 may be installed into an existing shower from the shower area. The installer does not need to directly access the area behind the shower wall. In other words, the installer does not need to remove a portion of the wall sufficient for the installer to reach through and manipulate structure (e.g., the water supply pipe P, the connection to the supply pipe P, etc.) behind the wall. The installer only needs to make a hole in the wall W to accommodate the supply adapter 40 and the upper supply bracket 56 is necessary. Thus, the shower bar system 20 may be retrofitted into an existing shower easily and in a cost-effective manner, as compared to other shower bar systems.

The shower bar system 20 can be installed in showers that have walls of varying thickness. As described above, the supply adapter 40 is able to accommodate walls of different thicknesses. The shower bar system 20 can be installed in showers in which the shower wall W is offset from a wall where the water supply is accessed or in which the outlet of the water supply pipe is a varying depths. The shower bar system 20 can be installed in such locations because the supply adapter 40 is able, as explained above, to telescope into and out of the upper supply bracket 56, thus allowing the shower bar system 20 to reach the household water supply, regardless of depth behind the wall W, while maintaining the shower bar 26 in a vertical orientation.

The shower bar system 20 may provide the transfer valve assembly 30 in a location which is more accessible to users (e.g., because of the lower height of the transfer valve assembly 30). The illustrated shower bar system 20 transfers the load to the shower wall, not the water supply pipe P.

Thus, the risk of damaging the water supply pipe P is minimized because pulling forces which may be transferred from the shower bar system 20 to the water supply pipe P are minimal. The illustrated shower bar system 20 may be able to withstand a pull force of 300 lbs. or more.

The tube-in-tube design of the shower bar 26 provides for greater flexibility of material selection for components disposed in the interior of the shower bar 26, such as the supply pipe 88, the first showerhead pipe 92, the second showerhead pipe 96, the inlet connector 64, etc. Various laws and codes limit the use of certain materials which may be exposed to the consumer directly or through the supplied water.

The shower bar system 20 may provide a handshower hose 264 that does not interfere with the shower on/off valve V. The angled hose connector 32 directs the handshower hose 264 around the shower on/off valve V, rather than on top of and/or against the shower on/off valve V (as is done by current handshower hoses), to avoid interference. The shower bar system 20 may provide a handshower 24 that is convenient and easy to use because the angled hose connector 32 swivels relative to the shower bar 26. Thus, the user is able to move the handshower 24 to different areas of the shower without having the handshower hose 264 bind on the shower bar 26.

The shower bar system 20 allows for the user to select a right-hand or a left-hand orientation. In the left-hand orientation, the handshower 24 is placed on the left-hand side of the shower bar 26, the bracket assembly 34 is turned to hold the handshower 24 on the left-hand side of the shower bar 26, and the angled hose connector 32 is swiveled to accommodate having the handshower 24 on the left-hand side of the shower bar 26. In the right-hand orientation, the handshower 24 is placed on the right-hand side of the shower and the bracket assembly 34 and angled hose connector 32 are moved accordingly. In some installations, it is desirable to select the right-hand or left-hand orientation due to obstructions on the shower wall such as, for example, soap holders, shelves, etc.

One or more independent features and independent advantages may be set forth in the following claims:

What is claimed is:

1. A shower system, the shower system being installed in a shower installation, the installation including a wall defining an opening therethrough, and a water supply having a supply pipe on a first side the wall and with a pipe outlet, the shower system comprising:
    an adapter having an inlet threadedly connectable to the pipe outlet on a first side of the wall, the adapter extending along an axis extending between the first side of the wall and an opposite second side of the wall, the adapter having an outer circumferential surface defining a groove, and
    a supply pipe operable to slidably receive the adapter therein, the supply pipe having a supply outlet in fluid communication with the adapter, the supply outlet being on the second side of the wall, the supply pipe having an inner circumferential surface;
    a seal positioned in the groove on the outer circumferential surface of the adapter with the inner circumferential surface of the supply pipe to seal an interface between the adapter and the supply pipe;
    a mounting collar fixedly connectable to the second side of the wall, the supply pipe being is fixedly connectable to the mounting collar to fixedly connect the supply pipe to the wall, the adapter being movable relative to the wall after connection to the pipe outlet and to the supply pipe;
    a shower bar having a shower bar inlet, the shower bar being fluidly connectable to the adapter, the shower bar being on the second side of the wall, a first shower member being fluidly connectable to the shower bar and operable to dispense water from the water supply, a second shower member being fluidly connectable to the shower bar and operable to dispense water from the water supply; and
    a diverter valve assembly connectable to the shower bar and operable to direct water to at least one of the first shower member or the second shower member.

2. The system of claim 1, wherein the shower bar is fixedly connectable to the wall through the supply pipe.

3. The system of claim 1, further comprising an escutcheon positioned around the supply member and covering the mounting collar.

4. The system of claim 1, wherein the supply pipe and the adapter are relatively movable along the axis to change a distance between the pipe outlet and the supply outlet.

5. The system of claim 1, wherein the groove is a first groove and the seal is a first seal supported in the first groove, and wherein the system further comprises a second seal positioned in a second groove on the outer circumferential surface of the adapter engageable with the inner circumferential surface of the supply pipe to seal the interface between the adapter and the supply pipe, the second groove and the second seal being spaced from the first groove and the first seal along the axis.

6. An assembly for a shower system, the shower system being installed in a shower installation, the installation including a wall defining an opening therethrough, and a water supply having a supply pipe on a first side the wall and with a pipe outlet, the assembly comprising:
    an adapter having an inlet threadedly connectable to the pipe outlet on a first side of the wall, the adapter extending along an axis extending between the first side of the wall and an opposite second side of the wall, the adapter having an outer circumferential surface defining a groove, and
    a supply pipe operable to slidably receive the adapter therein, the supply pipe having a supply outlet in fluid communication with the adapter, the supply outlet being on the second side of the wall, the supply pipe having an inner circumferential surface;
    a mounting collar fixedly connectable to the second side of the wall, the supply pipe being is fixedly connectable to the mounting collar to fixedly connect the supply pipe to the wall, the adapter being movable relative to the wall after connection to the pipe outlet and to the supply pipe; and
    a seal positioned in the groove on the outer circumferential surface of the adapter with the inner circumferential surface of the supply pipe to seal an interface between the adapter and the supply pipe;
    wherein a shower bar is fluidly connectable to the adapter, the shower bar being on the second side of the wall, a first shower member being fluidly connectable to the shower bar and operable to dispense water from the water supply, a second shower member being fluidly connectable to the shower bar and operable to dispense water from the water supply.

7. The assembly of claim 6, further comprising an escutcheon positioned around the supply member and covering the mounting collar.

8. The assembly of claim 6, wherein the supply pipe and the adapter are relatively movable along the axis to change a distance between the pipe outlet and the supply outlet.

9. The assembly of claim 6, wherein the groove is a first groove and the seal is a first seal supported in the first groove, and wherein the system further comprises a second seal positioned in a second groove on the outer circumferential surface of the adapter engageable with the inner circumferential surface of the supply pipe to seal the interface between the adapter and the supply pipe, the second groove and the second seal being spaced from the first groove and the first seal along the axis.

10. A method of installing a shower system into a shower installation, the installation including a wall defining an opening therethrough, and a water supply having a supply pipe on a first side the wall and with a pipe outlet, the method comprising:
- threadedly connecting an inlet of the adapter to the pipe outlet on the first side the wall, the adapter extending along an axis extending between the first side of the wall and an opposite, second side of the wall;
- connecting a supply pipe to the adapter including slidably inserting the adapter into the supply pipe, the supply pipe having a supply outlet in fluid communication with the adapter, the supply outlet being on the second side of the wall;
- fixedly connecting a mounting collar to the second side of the wall;
- fixedly connecting the supply pipe to the mounting collar to connect the supply pipe to the wall, after fixedly connecting a mounting collar to the second side of the wall and after connecting the supply pipe to the mounting collar, the adapter being movable relative to the mounting collar;
- sealing an interface between the supply pipe and the adapter including engaging a seal positioned in a groove on an outer circumferential surface of the adapter with an inner circumferential surface of the supply pipe;
- fluidly connecting a shower bar with the adapter, the shower bar being on the second side of the wall;
- fluidly connecting a first shower member to the shower bar, the first shower member being operable to dispense water from the water supply;
- fluidly connecting a second shower member to the shower bar, the second shower member being operable to dispense water from the water supply; and
- connecting a diverter valve assembly to the shower bar, the diverter valve being operable to direct water to at least one of the first shower member or the second shower member.

11. The method of claim 10, wherein fluidly connecting a shower bar with the adapter includes directly connecting the shower bar to the supply pipe, and wherein directly connecting the shower bar to the supply pipe includes fixedly connecting the shower bar to the wall through the supply pipe.

12. The method of claim 10, further comprising:
- positioning an escutcheon around the supply member; and
- covering the mounting collar with the escutcheon.

13. The method of claim 10, further comprising relatively moving the supply pipe and the adapter along the axis to change a distance between the pipe outlet and the supply outlet.

14. The method of claim 13, wherein relatively moving includes changing a distance between the pipe outlet and a shower bar inlet.

15. The method of claim 13, wherein relatively moving the supply member and the adapter includes relatively sliding the supply member and the adapter.

16. The method of claim 10, wherein the groove is a first groove and the seal is a first seal supported in the first groove, and wherein sealing an interface between the supply pipe and the adapter including engaging a second seal positioned in a second groove on the outer circumferential surface of the adapter with the inner circumferential surface of the supply pipe, the second groove and the second seal being spaced from the first groove and the first seal along the axis.

* * * * *